(12) United States Patent
Choi et al.

(10) Patent No.: US 11,774,976 B2
(45) Date of Patent: *Oct. 3, 2023

(54) MOVING ROBOT AND CONTROL METHOD THEREOF

(71) Applicant: LG ELECTRONICS INC., Seoul (KR)

(72) Inventors: Jieun Choi, Seoul (KR); Jungmin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 252 days.

This patent is subject to a terminal disclaimer.

(21) Appl. No.: 16/921,167

(22) Filed: Jul. 6, 2020

(65) Prior Publication Data

US 2021/0004015 A1 Jan. 7, 2021

(30) Foreign Application Priority Data

Jul. 5, 2019 (KR) .......................... 10-2019-0081458

(51) Int. Cl.
*G05D 1/02* (2020.01)
*G01S 17/89* (2020.01)
(Continued)

(52) U.S. Cl.
CPC ........... *G05D 1/0217* (2013.01); *G01C 21/32* (2013.01); *G01S 17/89* (2013.01); *G01S 17/931* (2020.01);
(Continued)

(58) Field of Classification Search
CPC .. G05D 1/0217; G05D 1/0214; G05D 1/0246; G05D 2201/0215;
(Continued)

(56) References Cited

U.S. PATENT DOCUMENTS 5,677,836 A 10/1997 Bauer
5,684,695 A 11/1997 Bauer
(Continued)

FOREIGN PATENT DOCUMENTS

JP H06-327599 11/1994
JP 2010-225125 10/2010
(Continued)

OTHER PUBLICATIONS

Machine Translation: WO-2019080679-A1 (Year: 2019).*
(Continued)

*Primary Examiner* — Anne Marie Antonucci
*Assistant Examiner* — Connor L Knight
(74) *Attorney, Agent, or Firm* — KED & ASSOCIATES, LLP

(57) ABSTRACT

A moving robot includes: a sensor to acquire terrain information; a memory to store node data for at least one node; and a controller, and the controller determines whether at least one open movement direction exists among a plurality of movement directions, based on sensing data and the node data, generates a new node in the node data when at least one open movement direction exists, determines any one of the open movement directions as a traveling direction for the robot, determines whether at least one of the nodes needs to be updated exists, based on the node data when the open movement direction does not exist, controls the moving robot to move to one of the nodes that need to be updated, and generates of a map including the at least one node, based on the node data, when the node that needs to be updated does not exist.

16 Claims, 26 Drawing Sheets

(51) Int. Cl.
    *G01S 17/931*     (2020.01)
    *G01C 21/32*     (2006.01)

(52) U.S. Cl.
    CPC ......... *G05D 1/0214* (2013.01); *G05D 1/0246* (2013.01); *G05D 2201/0215* (2013.01)

(58) Field of Classification Search
    CPC ......... G05D 2201/0203; G05D 1/0274; G05D 1/024; G05D 1/0212; G05D 1/0248; G05D 2201/02; G01C 21/32; G01C 21/3804; G01C 21/3837; G01C 21/3811; G01C 21/38; G01S 17/89; G01S 17/931; G01S 15/931; B25J 11/0085; B25J 9/0003; B25J 9/161; B25J 9/1664; B25J 13/08; B25J 19/022; B25J 19/023
    See application file for complete search history.

(56) References Cited

U.S. PATENT DOCUMENTS

| | | | |
|---|---|---|---|
| 5,793,934 | A | 8/1998 | Bauer |
| 8,676,429 | B2 | 3/2014 | Nakano et al. |
| 11,175,670 | B2 | 11/2021 | Artes et al. |
| 11,288,836 | B2* | 3/2022 | Park ............ G06T 7/73 |
| 11,399,687 | B2 | 8/2022 | Cheong |
| 2002/0015521 | A1 | 2/2002 | Kim |
| 2003/0030398 | A1 | 2/2003 | Jacobs et al. |
| 2004/0039498 | A1 | 2/2004 | Ollis et al. |
| 2004/0204792 | A1 | 10/2004 | Taylor et al. |
| 2005/0000543 | A1 | 1/2005 | Taylor et al. |
| 2005/0010331 | A1 | 1/2005 | Taylor et al. |
| 2005/0273967 | A1 | 12/2005 | Taylor et al. |
| 2006/0020369 | A1 | 1/2006 | Taylor et al. |
| 2007/0061043 | A1 | 3/2007 | Ermakov et al. |
| 2008/0273791 | A1 | 11/2008 | Lee et al. |
| 2009/0281661 | A1 | 11/2009 | Dooley et al. |
| 2010/0070078 | A1 | 3/2010 | Kong et al. |
| 2010/0324731 | A1 | 12/2010 | Letsky |
| 2010/0328457 | A1 | 12/2010 | Lee |
| 2011/0098874 | A1 | 4/2011 | Choi et al. |
| 2011/0137461 | A1 | 6/2011 | Kong et al. |
| 2011/0167574 | A1 | 7/2011 | Stout |
| 2012/0106829 | A1 | 5/2012 | Lee et al. |
| 2012/0143372 | A1 | 6/2012 | Roh |
| 2013/0138247 | A1 | 5/2013 | Gutmann et al. |
| 2014/0009748 | A1 | 1/2014 | Leonessa et al. |
| 2014/0142891 | A1 | 5/2014 | Lucidarme et al. |
| 2015/0242806 | A1 | 8/2015 | Cousins et al. |
| 2016/0005229 | A1 | 1/2016 | Lee et al. |
| 2016/0069691 | A1 | 3/2016 | Fong et al. |
| 2016/0132056 | A1 | 5/2016 | Yoshino |
| 2016/0167226 | A1 | 6/2016 | Schnittman |
| 2016/0302638 | A1* | 10/2016 | Haegermarck ...... G05D 1/0219 |
| 2017/0028556 | A1 | 2/2017 | Summer |
| 2017/0131721 | A1 | 5/2017 | Kwak et al. |
| 2017/0239813 | A1* | 8/2017 | Vicenti .......... B25J 9/163 |
| 2018/0177361 | A1 | 6/2018 | Song et al. |
| 2018/0239355 | A1 | 8/2018 | Lee et al. |
| 2018/0267552 | A1 | 9/2018 | Artes et al. |
| 2018/0289228 | A1 | 10/2018 | Xue et al. |
| 2018/0290748 | A1 | 10/2018 | Corban |
| 2018/0296049 | A1 | 10/2018 | Izawa et al. |
| 2018/0306587 | A1 | 10/2018 | Holz |
| 2018/0314254 | A1* | 11/2018 | Bauer ............ G09B 29/00 |
| 2018/0361583 | A1* | 12/2018 | Williams ............ B25J 9/1679 |
| 2019/0011929 | A1 | 1/2019 | Maeno |
| 2019/0025838 | A1 | 1/2019 | Artes et al. |
| 2019/0035100 | A1 | 1/2019 | Ebrahimi Afrouzi et al. |
| 2019/0061157 | A1 | 2/2019 | Suvarna et al. |
| 2019/0086539 | A1 | 3/2019 | Lee et al. |
| 2019/0090712 | A1 | 3/2019 | Cheong |
| 2019/0094869 | A1 | 3/2019 | Artes et al. |
| 2019/0094870 | A1 | 3/2019 | Afrouzi et al. |
| 2019/0113927 | A1 | 4/2019 | Englard et al. |
| 2019/0220020 | A1* | 7/2019 | Macias ............ G01C 21/206 |
| 2019/0301873 | A1 | 10/2019 | Prasser |
| 2019/0310653 | A1* | 10/2019 | Lee ............ G05D 1/0238 |
| 2019/0332121 | A1 | 10/2019 | Kim et al. |
| 2019/0339703 | A1 | 11/2019 | Bao et al. |
| 2020/0393545 | A1 | 12/2020 | Shani et al. |
| 2021/0048312 | A1* | 2/2021 | Choi ............ G01C 21/3837 |
| 2022/0137637 | A1* | 5/2022 | Baldini ............ G05D 1/0274 |
| | | | 701/25 |

FOREIGN PATENT DOCUMENTS

| | | |
|---|---|---|
| JP | 2012-011200 | 1/2012 |
| JP | 2014-123200 | 7/2014 |
| JP | 2017-083663 | 5/2017 |
| JP | 2019-505256 | 2/2019 |
| KR | 10-0611328 | 8/2006 |
| KR | 10-0715609 | 5/2007 |
| KR | 10-0791384 | 1/2008 |
| KR | 10-2010-0031878 | 3/2010 |
| KR | 10-2010-0070582 | 6/2010 |
| KR | 10-2011-0000848 | 1/2011 |
| KR | 10-2012-0047137 | 5/2012 |
| KR | 10-1179075 | 9/2012 |
| KR | 10-1242252 | 3/2013 |
| KR | 10-2013-0112507 | 10/2013 |
| KR | 10-2014-0009737 | 1/2014 |
| KR | 10-1427186 | 8/2014 |
| KR | 10-1553654 | 10/2015 |
| KR | 10-2016-0036008 | 4/2016 |
| KR | 10-2018-0074537 | 7/2018 |
| KR | 10-2018-0082264 | 7/2018 |
| KR | 10-2019-0103511 | 9/2019 |
| WO | WO 2017/173553 | 10/2017 |
| WO | WO 2018/043180 | 3/2018 |
| WO | WO-2019080679 A1 * | 5/2019 ............ G01C 21/32 |

OTHER PUBLICATIONS

Korean Notice of Allowance dated May 29, 2021 issued in KR Application No. 10-2019-0083998.
International Search Report dated Jan. 8, 2021 issued in International Application No. PCT/KR2020/009048.
International Search Report dated Oct. 30, 2020 issued in International Application No. PCT/KR2020/008724.
International Search Report dated Dec. 23, 2020 issued in International Application No. PCT/KR2020/009343.
International Search Report dated Dec. 23, 2020 issued in International Application No. PCT/KR2020/008715.
United States Office Action dated Dec. 2, 2022 issued in co-pending related U.S. Appl. No. 16/929,423.
United States Office Action dated Jul. 15, 2022 issued in co-pending related U.S. Appl. No. 16/920,082.
United States Office Action dated Aug. 18, 2022 issued in co-pending related U.S. Appl. No. 16/929,423.
United States Office Action dated Sep. 1, 2022 issued in co-pending related U.S. Appl. No. 16/925,798.
United States Office Action dated Sep. 2, 2022 issued in co-pending related U.S. Appl. No. 16/924,848.
U.S. Appl. No. 16/920,082, filed Jul. 2, 2020.
U.S. Appl. No. 16/925,798, filed Jul. 10, 2020.
U.S. Appl. No. 16/924,848, filed Jul. 9, 2020.
U.S. Appl. No. 16/929,423, filed Jul. 15, 2020.
Japanese Office Action dated Feb. 21, 2023 issued in JP Application No. 2022-500912.
Japanese Office Action dated Mar. 14, 2023 issued in Application No. 2022-502504.
U.S. Office Action dated Jun. 5, 2023 issued in Application No. 16/929,423.
Extended European Search Report dated Apr. 18, 2023 issued in Application No. 20837393.6.
Extended European Search Report dated Jul. 20, 2023 issued in Application No. 20836675.7.
Kuipers B et al: "A Robot Exploration and Mapping Strategy Based on a Semantic Hierarchy of Spatial Representations*", Robotics and

(56) References Cited

OTHER PUBLICATIONS

Autonomous Systems, Elsevier BV, Amsterdam, NL, vol. 8, No. 1/02, Nov. 1, 1991 (Nov. 1, 1991), pp. 47-63, XP000243465.
Extended European Search Report dated May 26, 2023 issued in Application No. 20839883.4.
Wang Nan et al: "A hybrid map representation for simultaneous localization and mapping of the internal ruins environment", 2013 IEEE International Conference on Information and Automation (ICIA), IEEE, Aug. 26, 2013 (Aug. 26, 2013), pp. 1060-1065, XP032558883.

* cited by examiner

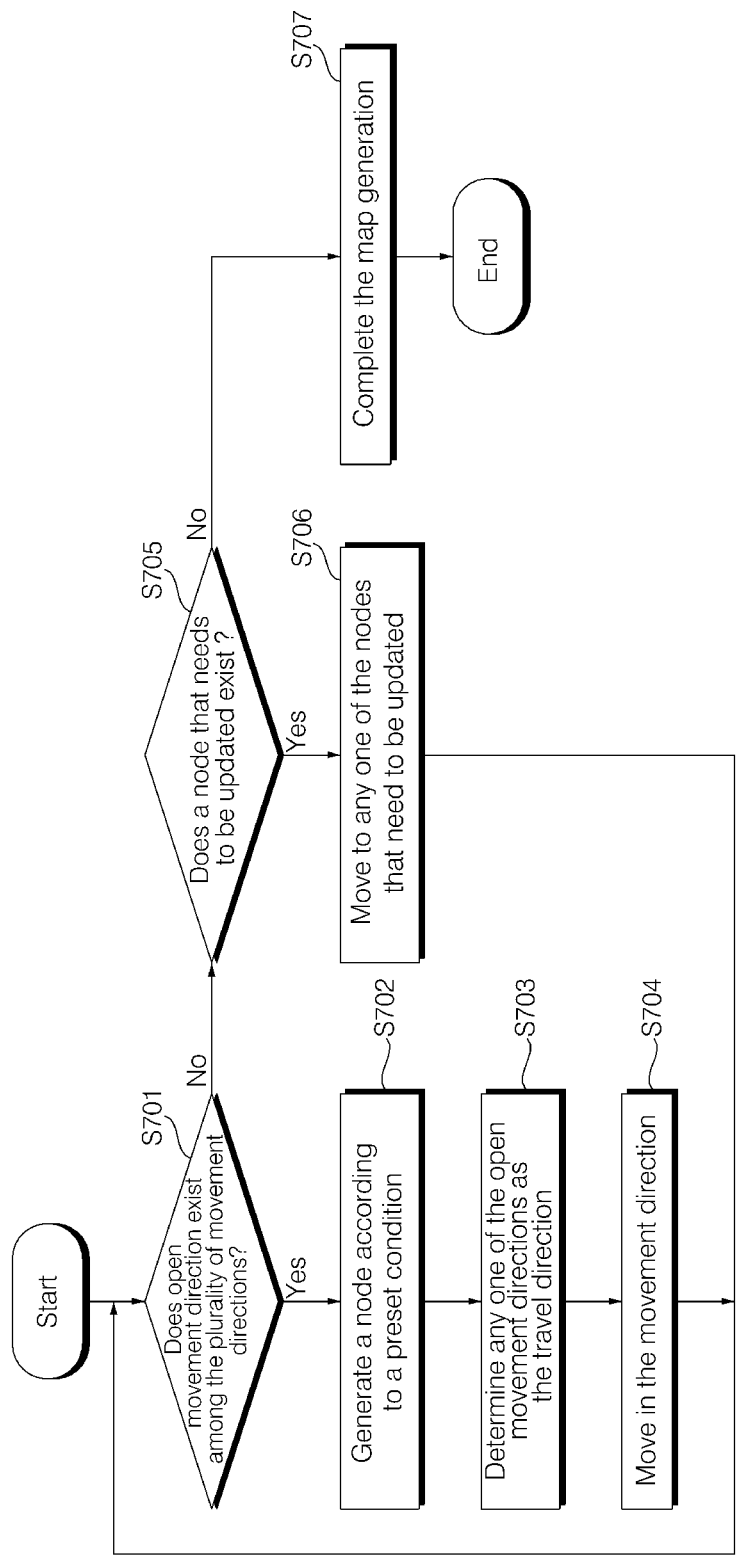

MOVING ROBOT AND CONTROL METHOD THEREOF

CROSS-REFERENCE TO RELATED APPLICATION

This application claims priority under 35 U.S.C. § 119 to Korean Application No. 10-2019-0081458 filed on Jul. 5, 2019, whose entire disclosure is hereby incorporated by reference. This application is also related to U.S. patent application Ser. No. 16/920,082 filed on Jul. 2, 2020, U.S. patent application Ser. No. 16/925,798 filed on Jul. 20, 2020, U.S. patent application No. 16/924,848 filed on Jul. 9, 2020, and U.S. patent application Ser. No. 16/929,423 filed on July 15, 2020, whose entire disclosures are also hereby incorporated by reference.

BACKGROUND

1. Field

The present disclosure relates to a moving robot and a control method thereof, and more particularly, to a technology which allows a moving robot to generate and learn a map or to recognize a position on the map.

2. Background

Robots have been developed for industrial use and have been in charge of part of factory automation. In recent years, the field of application of robots has been further expanded, medical robots, aerospace robots, and the like have been developed, and home robots that can be used in a general home also have been manufactured. Among these robots, a robot capable of traveling by itself is called a moving robot.

A typical example of a moving robot used in a home is a robot cleaner. The robot cleaner is an apparatus that cleans a corresponding area by sucking surrounding dust or foreign matter while traveling a certain area by itself.

The moving robot is capable of moving by itself to move freely, and a plurality of sensors are provided to avoid obstacles, and the like while traveling, so that the moving robot can travel while avoiding obstacles.

In order to perform a set operation such as cleaning, it is necessary to accurately generate a map of traveling area, and accurately determine the current position of the moving robot on the map to move to a certain position in the traveling area.

For example, in the case of the prior art 1 (Korean Patent Publication No. 10-2010-0070582), it is disclosed that an initial map is generated through a distance sensor that detects distance information of surrounding environment, and a global topological map is generated by setting a node through pixel processing of the initial map.

However, prior arts such as the prior art 1 simply generate an initial map as a whole based on the distance information acquired while moving, and generate a topological map by deciding a node based on the generated initial map. Therefore, the connecting relationship between nodes is somewhat inaccurate.

In addition, it is difficult to accurately distinguish and process dynamic obstacles temporarily positioned when acquiring distance information, and fixed obstacles, and it is difficult to accurately acquire information on points at which moving paths intersect.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 7 is a flowchart illustrating a control method of a moving robot, according to an embodiment of the present disclosure.

DETAILED DESCRIPTION

Figure 1A:
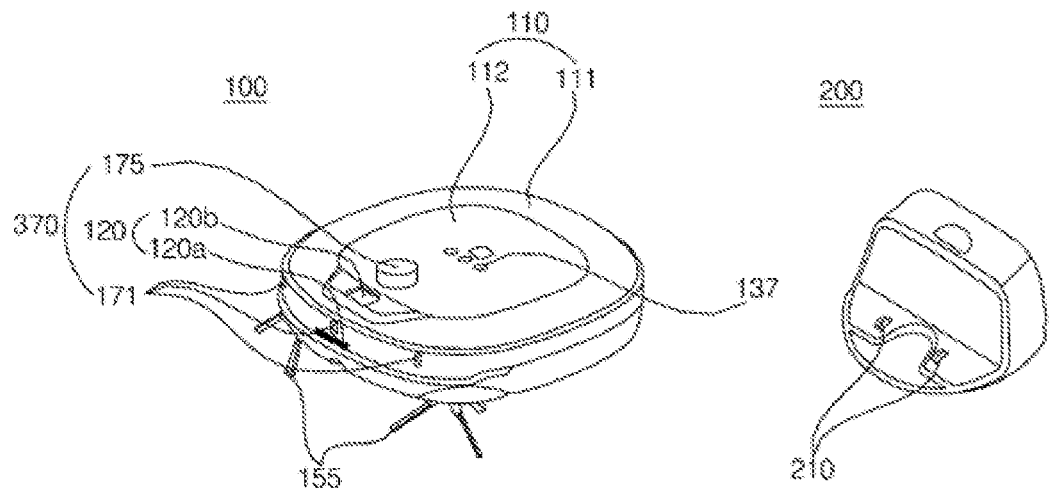
FIG. 1A to FIG. 1D are diagrams illustrating an example of a moving robot, according to an embodiment of the present disclosure.

Reference will now be made in detail to the embodiments of the present disclosure, examples of which are illustrated in the accompanying drawings. To clearly and briefly describe the present disclosure, a part without concerning to the description is omitted in the drawings, and the same or like reference numerals in the specification denote the same elements.

The suffixes "module" and "unit" of elements herein are used for convenience of description and thus may be used interchangeably and do not have any distinguishable meanings or functions. Thus, the "module" and the "unit" may be interchangeably used.

Throughout this specification, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

It will be understood that, although the terms "first", "second", "third" etc. may be used herein to describe various elements, these elements should not be limited by these terms. These terms are only used to distinguish one element from another element.

A moving robot 100 according to an embodiment of the present disclosure means a robot capable of moving by itself by using a wheel or the like, and may be a home helper robot and a robot cleaner. Hereinafter, with reference to the drawings, a robot cleaner having a cleaning function among moving robots will be described as an example, but the present disclosure is not limited thereto.

FIG. 1A to FIG. 1D, and FIG. 2 are diagrams illustrating an example of the moving robot 100 according to various embodiments of the present disclosure.

Figure 1B:
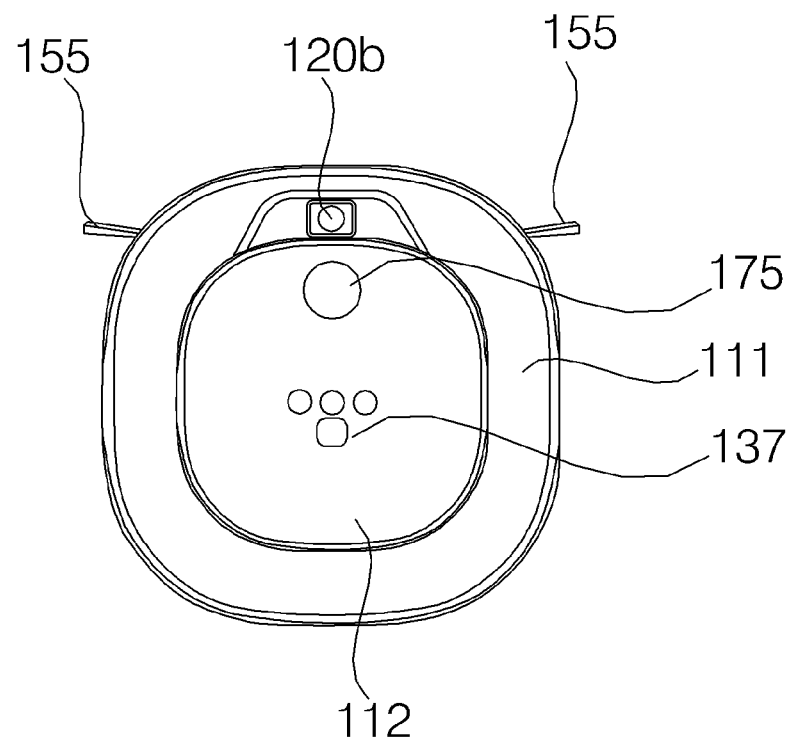
Figure 1C:
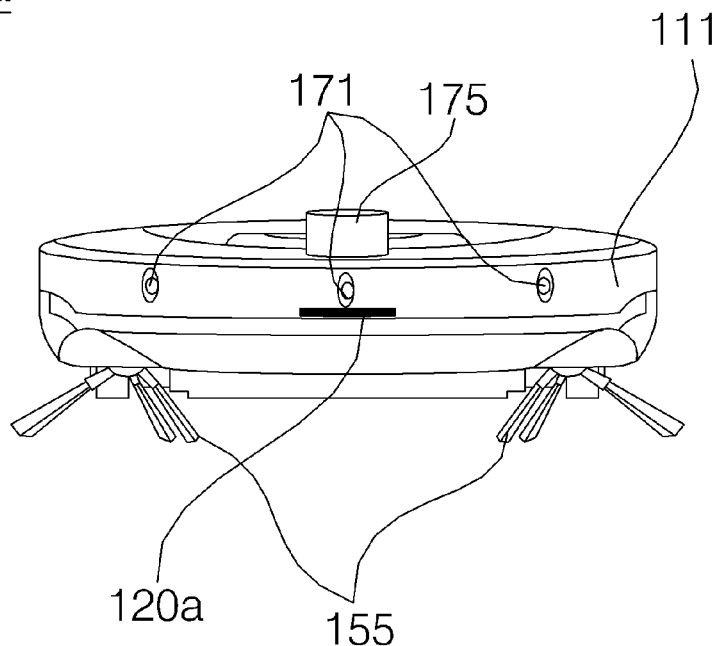
Figure 1D:
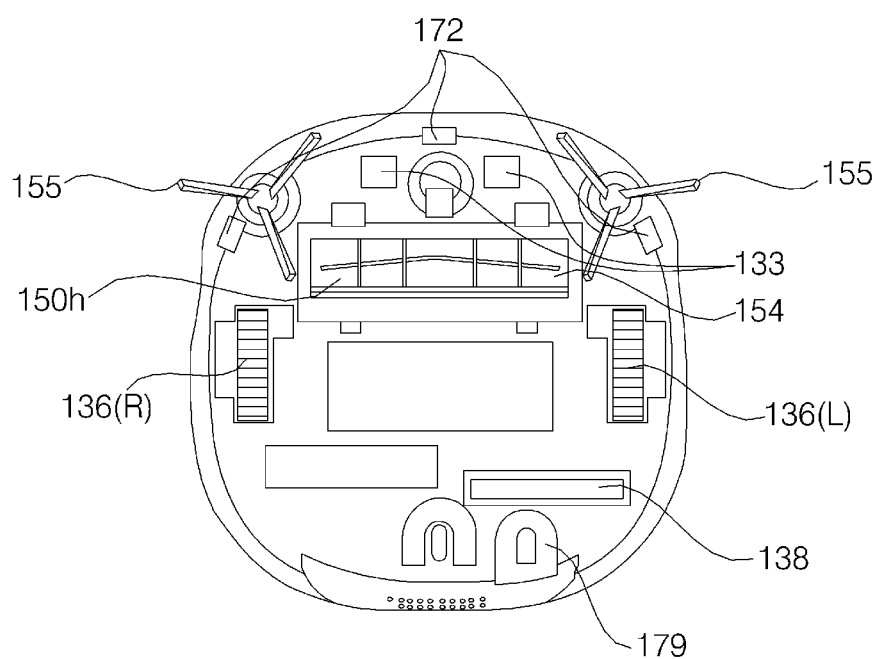

FIG. 1A is a perspective view showing a moving robot 100*a* and a charging base 200 for charging the moving robot 100*a* according to an embodiment of the present disclosure, FIG. 1B is a view showing a top portion of the moving robot 100*a* shown in FIG. 1A, FIG. 1C is a view showing a front portion of the moving robot 100*a* shown in FIG. 1A, and FIG. 1D is a view showing a bottom portion of the moving robot 100*a* shown in FIG. 1A.

Figure 2:
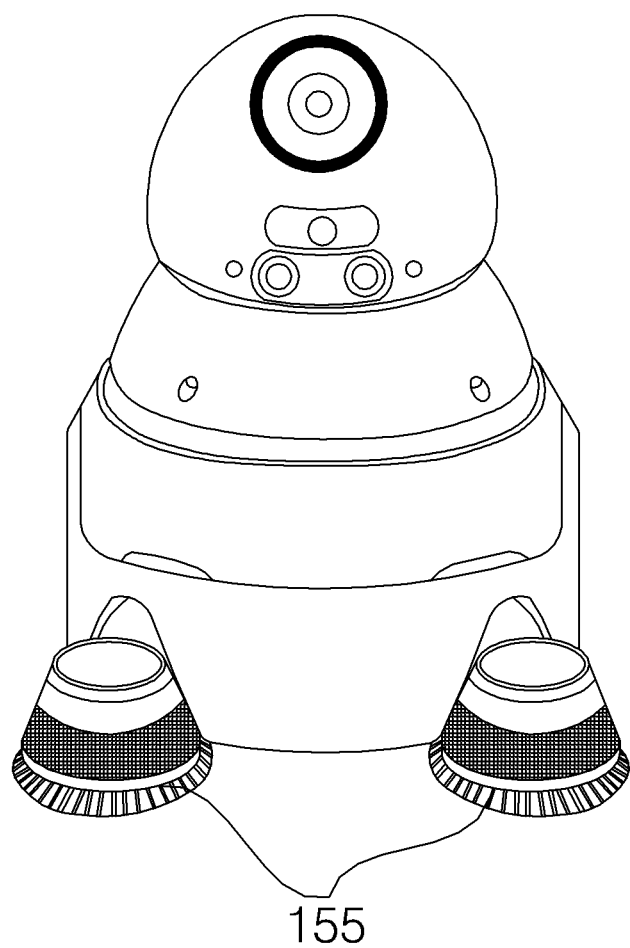
FIG. 2 is a diagram illustrating an example of a moving robot, according to another embodiment of the present disclosure.

Meanwhile, FIG. 2 is a diagram illustrating an example of a moving robot 100*b* according to another embodiment of the present disclosure, and since the moving robot 100*b* shown in FIG. 2 may have the same or similar configurations as the moving robot 100*a* disclosed in FIGS. 1A to 1D, detailed description thereof will be omitted.

Referring to FIG. 1A to FIG. 1D, the moving robot 100*a* may include, for example, at least one driving wheel 136 that moves a main body 110. The driving wheel 136 may be driven and rotated by, for example, at least one motor (not shown) connected to the driving wheel 136.

The driving wheel 136 may be provided in the left and right sides of the main body 110 respectively, and hereinafter is referred to as a left wheel 136L and a right wheel 136R respectively.

The left wheel 136L and the right wheel 136R may be driven by a single driving motor, but if necessary, a left wheel driving motor for driving a left wheel 136L and a right wheel driving motor for driving a right wheel 136R may be provided, respectively. The travel direction of the main body 110 can be switched to the left or right side by making a difference in the rotational speed of the left wheel 136L and the right wheel 136R.

The moving robot 100*a* may include, for example, a suction device (not shown) that sucks foreign material, a brush 154 and 155 that performs brushing, a dust container (not shown) that stores foreign matter collected by the suction device or the brush 154, 155, and a mop part (not shown) that performs mopping.

For example, a suction port 150*h* through which air is sucked may be formed in the bottom surface of the main body 110, and a suction device that provides suction force so that air can be sucked through the suction port 150*h*, and a dust container that collects dust sucked through the suction port 150*h* together with air may be provided inside the main body 110.

The moving robot 100*a* may include, for example, a case 111 forming a space in which various components constituting the moving robot 100*a* are accommodated. An opening (not shown) for insertion and removal of the dust container may be formed in the case 111, and a dust container cover 112 that opens and closes the opening may be rotatably provided with respect to the case 111.

The moving robot 100*a* may include, for example, a roll-type main brush 154 having brushes exposed through the suction port 150*h*, and an auxiliary brush 155 located in the front side of the bottom portion of the main body 110 and having a brush formed of a plurality of feathers extended radially. Dust is separated from the floor in the traveling area due to rotation of these brushes 154 and 155, and the dust separated from the floor is sucked through the suction port 150*h* and may be introduced into the dust container through a suction flow path (not shown).

Air and dust may be separated from each other while passing through a filter or cyclone of the dust container, and the separated dust may be collected in the dust container. After being discharged from the dust container, air may be finally discharged to the outside through an exhaust port (not shown) via an exhaust passage (not shown) inside the main body 110.

The battery 138 may supply, for example, power required for the overall operation of the moving robot 100*a* as well as the driving motor. Meanwhile, when the battery 138 is discharged, the moving robot 100*a* may perform traveling to return to the charging base 200 for charging, and during such return traveling, the moving robot 100*a* can detect the position of the charging base 200 by itself.

The charging base 200 may include, for example, a signal transmission unit (not shown) that transmits a certain return signal. The return signal may be, for example, an ultrasonic signal or an infrared signal, but is not limited thereto.

The moving robot 100*a* may include, for example, a signal detection unit (not shown) that receives a return signal.

For example, the signal detection unit may include an infrared sensor that detects an infrared signal, and may receive an infrared signal transmitted from the signal transmission unit of the charging base 200. At this time, the moving robot 100*a* may move to a position of the charging base 200 according to the infrared signal transmitted from the charging base 200 and dock with the charging base 200. A charging terminal 133 of the moving robot 100 and a charging terminal 210 of the charging base 200 may be contacted due to such a docking, and the battery 138 may be charged.

The moving robot 100*a*, for example, may have a configuration for detecting information inside/outside the moving robot 100.

The moving robot 100*a* may include, for example, a camera 120 that acquires image information related to a traveling area.

For example, the moving robot 100*a* may include a front camera 120*a* provided to acquire an image in front of the main body 110.

For example, the moving robot 100*a* may include an upper camera 120*b* that is provided in the upper surface of the main body 110, and acquires an image of ceiling in the traveling area.

For example, the moving robot 100*a* may further include a lower camera 179 that is provided in the bottom surface of the main body 110 and acquires an image of the floor.

Meanwhile, the number of cameras 120 provided in the moving robot 100*a*, the position of being disposed, and the photographing range are not necessarily limited thereto, and cameras 120 may be disposed in various positions to acquire image information related to the traveling area.

For example, the moving robot 100*a* may include a camera (not shown) that is disposed to be inclined with respect to one surface of the main body 110 and configured to photograph the front side and the top side together.

For example, the moving robot 100*a* may include a plurality of front cameras 120*a* and/or upper cameras 120*b*, or may include a plurality of cameras configured to photograph the front side and the top side together.

According to various embodiments of the present disclosure, a camera 120 is installed in a certain portion (ex, a front side, a rear side, a bottom surface) of the moving robot 100*a*, and images can be continuously acquired during traveling or cleaning. For the photographing efficiency, a plurality of cameras 120 may be installed for each portion, and the image photographed by the camera 120 may be used to recognize the type of a matter such as dust, hair, floor existing in a corresponding space, may be used to check whether cleaning is performed, or used to check cleaning time.

The moving robot 100a may include, for example, a light detection and ranging LiDAR sensor 175 that acquires terrain information outside the main body 110 by using a laser.

The lidar sensor 175 outputs, for example, a laser and receives the laser reflected from an object, thereby acquiring information such as distance to the object that reflected the laser, position direction, material, or the like, and acquiring terrain information of the traveling area. The moving robot 100 may acquire, for example, 360-degree geometry information based on the information acquired through the lidar sensor 175.

The moving robot 100a may include, for example, sensors 171, 172, 179 that sense various data related to the operation and state of the moving robot 100a.

For example, the moving robot 100a may include an obstacle detection sensor 171 that detects an obstacle ahead, a cliff detection sensor 172 that detects a cliff in the floor in the traveling area, and the like.

The moving robot 100a may include, for example, an operation unit 137 capable of inputting various commands such as power on/off of the moving robot 100a, and may receive various control commands required for the overall operation of the moving robot 100a through the operation unit 137.

The moving robot 100a may include, for example, an output unit (not shown), and display reservation information, battery state, operation mode, operation state, error state, and the like.

Figure 3:
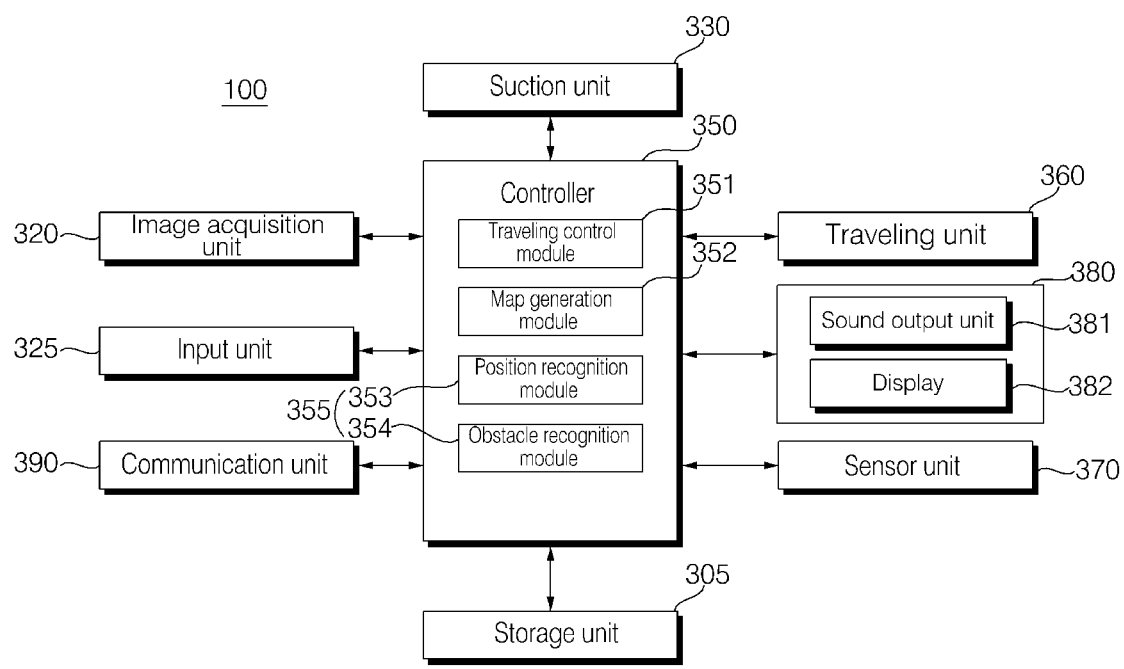
FIG. 3 is an example of an internal block diagram of a moving robot, according to another embodiment of the present disclosure.

FIG. 3 is an example of an internal block diagram of a moving robot 100 according to another embodiment of the present disclosure.

Referring to FIG. 3, the moving robot 100 may include, for example, a storage unit 305, an image acquisition unit 320, an input unit 325, a suction unit 330, a controller 350, a traveling unit 360, a sensor unit 370, an output unit 380, and/or a communication unit 390.

Meanwhile, as the robot cleaner is illustrated by way of example of the moving robot 100 in the drawing, the suction unit 330 is described to be included, but the present disclosure is not limited thereto, and various configurations may be included depending on the function and the purpose of the moving robot 100.

The storage unit 305 may store, for example, various information necessary for the control of the moving robot 100.

The storage unit 305 may include, for example, a volatile or nonvolatile recording medium. The recording medium stores data that can be read by a microprocessor, and is not limited to the type or implementation method.

The storage unit 305 may store, for example, a map for the traveling area. The map stored in the storage unit 305, for example, may be received from an external terminal, a server, or the like capable of exchanging information with the moving robot 100 through wired or wireless communication, or may be created by the moving robot 100 by learning by itself.

The storage unit 305 may store, for example, data for node. Here, the node may mean, for example, one point on the traveling area. The data for node may include, for example, coordinate on a traveling area for node, information on a plurality of movement directions in node, information on relationship with other node, and the like.

For example, the map may display the positions of rooms in the traveling area. In addition, the current position of the moving robot 100 may be displayed on the map, and the current position of the moving robot 100 on the map may be updated in the traveling process. The external terminal may store the same map as the map stored in the storage unit 305.

The storage unit 305 may store, for example, cleaning history information. Such cleaning history information may be generated whenever cleaning is performed.

The map for the traveling area stored in the storage unit 305 may be, for example, a navigation map used for traveling during cleaning, a simultaneous localization and mapping (SLAM) map used for position recognition, a learning map used to clean by storing and learning corresponding information when collides with an obstacle, a global topological map used for global position recognition, an obstacle recognition map in which information related to recognized obstacle is recorded, and the like.

Meanwhile, as described above, maps may be classified to be stored and managed in the storage unit 305 for each use, but the map may not be clearly classified for each use. For example, a plurality of information may be stored in one map to be used with at least two or more purposes.

The image acquisition unit 320 may acquire, for example, an image around the moving robot 100. The image acquisition unit 320 may include, for example, at least one camera (e.g. the camera 120 of FIG. 1A). Hereinafter, an image acquired through the image acquisition unit 320 may be referred to as an 'acquisition image'.

The image acquisition unit 320 may include, for example, a digital camera. The digital camera may include at least one optical lens, an image sensor (e.g. a CMOS image sensor) including a plurality of photodiodes (e.g. pixel) forming an image passed through the optical lens, and a digital signal processor DSP that forms an image based on the signal output from the photodiodes. The digital signal processor may generate, for example, not only a still image but also a moving image configured of frames formed of still images.

The image acquisition unit 320 may, for example, photograph a situation of an obstacle or a cleaning area existing in the front of the travel direction of the moving robot 100.

According to an embodiment of the present disclosure, the image acquisition unit 320 may acquire a plurality of images by continuously photographing the surroundings of the main body 110, and the acquired plurality of images may be stored in the storage unit 305.

The moving robot 100 may increase the accuracy of obstacle recognition by using, for example, a plurality of images, or may increase the accuracy of obstacle recognition by selecting one or more images from a plurality of images and using effective data.

The input unit 325 may include, for example, an input device (e.g. a key, a touch panel, etc.) capable of receiving user input. For example, the input unit 325 may include an operation unit 137 capable of inputting various commands such as power on/off of the moving robot 100a.

The input unit 325 may receive a user input through, for example, an input device, and transmit a command corresponding to the received user input to the controller 350.

The suction unit 330 may, for example, suck air containing dust. The suction unit 330 may include, for example, a suction device (not shown) that sucks foreign matter, a brush 154, 155 for performing the brushing, a dust container (not shown) for storing the foreign matter collected by the suction device or brush (e.g. brush 154, 155 in FIG. 1C), a suction port (e.g. the suction port 150h of FIG. 1D) through which air is sucked, and the like.

The traveling unit 360 may, for example, move the moving robot 100. The traveling unit 360 may include, for example, at least one driving wheel for moving the moving robot 100 (e.g. the driving wheel 136 of FIG. 1C) and at least one motor (not shown) for rotating the driving wheel.

The sensor unit 370 may include, for example, various sensors that detect information on the inside/outside of the moving robot 100.

The sensor unit 370 may include, for example, a lidar sensor (e.g. the lidar sensor 175 of FIG. 1A) that acquires terrain information on the outside of the main body 110 by using a laser.

The sensor unit 370 may include, for example, an obstacle detection sensor that detects an obstacle ahead (e.g. the obstacle detection sensor 171 of FIG. 1A), a cliff detection sensor that detects a cliff in the floor in the traveling area (e.g. the cliff detection sensor 172 of FIG. 1D), and the like.

A plurality of obstacle detection sensors 171 may be disposed, for example, at regular intervals in the outer circumferential surface of the moving robot 100. The obstacle detection sensor 171 may include, for example, an infrared sensor, an ultrasonic sensor, a radio frequency (RF) sensor, a geomagnetic sensor, a position sensitive device (PSD) sensor, and the like.

The obstacle detection sensor 171 may be, for example, a sensor that detects a distance to an indoor wall or an obstacle, and the present disclosure is not limited thereto, but the ultrasonic sensor will be illustrated below.

The obstacle detection sensor 171 may detect, for example, an object, particularly, an obstacle existing in the traveling (moving) direction of the moving robot 100 and transmit obstacle information to the controller 350. That is, the obstacle detection sensor 171 detects the movement path of the moving robot 100, a projecting object existing in the front side or lateral side of the moving robot 100, the furnishings in the house, furniture, a wall surface, a wall edge, and the like, and may transmit detection information to the controller 350.

The sensor unit 370 may further include, for example, a travel detection sensor (not shown) that detects a travel motion of the moving robot 100 and outputs motion information. The travel detection sensor may include, for example, a gyro sensor, a wheel sensor, an acceleration sensor, and the like.

The gyro sensor may detect, for example, a rotation direction and a rotation angle when the moving robot 100 moves according to an operation mode. The gyro sensor may detect, for example, the angular velocity of the moving robot 100 and output a voltage value proportional to the angular velocity.

The wheel sensor is connected to, for example, the driving wheel 136 (e.g. the left wheel 136L and the right wheel 136R of FIG. 1D) to detect the number of revolutions of the driving wheel 136. Here, the wheel sensor may be, for example, an encoder. The encoder can detect and output the number of revolutions of the left wheel 136L and the right wheel 136R. The acceleration sensor can detect, for example, a speed change of the moving robot 100. The acceleration sensor may be attached to, for example, an adjacent position of the driving wheel 136, or may be embedded in the controller 350.

The output unit 380 may include, for example, a sound output unit 381 that outputs an audio signal. Under the control of the controller 350, the sound output unit may output a warning message such as a warning sound, an operation mode, an operation state, and an error state, information corresponding to user's command input, processing result corresponding to user's command input, and the like as sound.

The sound output unit 381, for example, may convert and output an electrical signal from the controller 150 to an audio signal. To this end, a speaker or the like may be provided.

The output unit 380 includes a display 382 that displays, for example, information corresponding to user's command input, a processing result corresponding to user's command input, an operation mode, an operation state, an error state, and the like as an image.

In some embodiments, the display 382 may be configured as a touch screen by forming a mutual layer structure with a touch pad. In this case, the display 382 configured as a touch screen may be used as an input device capable of inputting information by user's touch in addition to an output device.

The communication unit 390 may include, for example, at least one communication module (not shown), and may transmit and receive data with an external device. Among the external devices that communicate with the moving robot 100, an external terminal includes, for example, an application for controlling the moving robot 100, and displays a map for a traveling area to be cleaned by the moving robot 100 through execution of the application, and may designate an area to clean a specific area on the map. The external terminal may be, for example, a remote controller, PDA, laptop, smart phone, tablet, or the like equipped with an application for map setting.

The communication unit 390 may transmit/receive signals through wireless communication method such as Wi-Fi, Bluetooth, beacon, zigbee, and radio frequency identification (RFID).

Meanwhile, the moving robot 100 may include, for example, a power supply unit (not shown) provided with a rechargeable battery (e.g. the battery 138 of FIG. 1D) to supply power into the robot cleaner.

The power supply unit may supply, for example, driving power and operating power to respective components of the moving robot 100.

The moving robot 100 may further include a battery detection unit (not shown) that detects, for example, a battery remaining amount, a charging state of the battery 138, and the like and may transmit the detection result to the controller 350. Meanwhile, information on the battery remaining amount may be output through, for example, the output unit 380.

The controller 350 may be connected, for example, to each component provided in the moving robot 100. The controller 350 may, for example, transmit and receive signals to and from each component provided in the moving robot 100 and control the overall operation of each component.

The controller 350 may, for example, determine a state of the inside/outside of the moving robot 100, based on information acquired through the sensor unit 370.

The controller 350 may, for example, calculate the rotation direction and rotation angle by using a voltage value output from a gyro sensor.

The controller 350 may calculate, for example, a rotation speed of the driving wheel 136, based on the number of rotations output from the wheel sensor. In addition, the controller 350 may calculate, for example, a rotation angle based on a difference in the number of revolutions of the left wheel 136L and the right wheel 136R.

The controller 350 may determine, for example, a state change of the moving robot 100, such as starting, stopping, direction change, and colliding with an object, based on the value output from the acceleration sensor. Meanwhile, the controller 350 may detect, for example, the impact amount according to the speed change, based on the value output from the acceleration sensor the acceleration sensor such that the acceleration sensor can serve as an electronic bumper sensor.

The controller 350 may, for example, detect the position of the obstacle and control the movement of the moving robot 100 according to the detected position of the obstacle, based on at least two or more signals received through the ultrasonic sensor.

In some embodiments, the obstacle detection sensor 131 provided on the outer surface of the moving robot 100 may include a transmitter and a receiver.

For example, the ultrasonic sensor may be provided such that at least one transmitter and at least two receivers are staggered. Accordingly, the transmitter may emit an ultrasonic signal at various angles, and at least two or more receivers may receive the ultrasonic signal reflected by an obstacle at various angles.

In some embodiments, the signal received from the ultrasonic sensor may go through a signal processing process such as amplification and filtering, and then a distance and direction to an obstacle may be calculated.

Meanwhile, the controller 350 may include, for example, a traveling control module 351, a map generation module 352, a position recognition module 353, and/or an obstacle recognition module 354. In this drawing, for convenience of explanation, the traveling control module 351, the map generation module 352, the position recognition module 353, and/or the obstacle recognition module 354 are described separately, but the present disclosure is limited thereto.

For example, the position recognition module 353 and the obstacle recognition module 354 may be integrated as a single recognizer and constitute a single recognition module 355. In this case, the recognizer is learned by using a learning technique such as machine learning, and the learned recognizer may classify later inputted data and recognize the attribute of an area, an object, or the like.

In some embodiments, the map generation module 352, the position recognition module 353, and the obstacle recognition module 354 may be configured as a single integrated module.

The traveling control module 351 may control, for example, traveling of the moving robot 100, and control driving of the traveling unit 360 according to the traveling setting.

The traveling control module 351 may determine, for example, the traveling route of the moving robot 100 based on the operation of the traveling unit 360. For example, the driving control module 351 may determine the current or past moving speed of the moving robot 100, the traveled distance, etc. based on the rotational speed of the driving wheel 136. Based on traveling information of the moving robot 100 that is determined in such a manner, the position of the moving robot 100 on the map may be updated.

The map generation module 352 may, for example, generate a map for the traveling area.

The map generation module 352 may, for example, generate and/or update the map in real time based on the acquired information while the moving robot 100 is driving.

The map generation module 352 may, for example, set a plurality of movement directions. For example, when a function (hereinafter, a map generation function) for generating a map for a traveling area is executed, the map generation module 352 may set the direction in which the front surface of the moving robot 100 faces at the time when the function is executed as a first movement direction. In addition, the map generation module 352, for example, may set the direction in which the left side surface of the moving robot 100 faces at the time when the function is executed as a second movement direction, set the direction in which the right side surface of the moving robot 100 faces as a third movement direction, and set the direction in which the rear surface of the moving robot 100 faces, which is the direction opposite to the first direction, as a fourth movement direction.

Meanwhile, a preset plurality of movement directions, for example, may be fixed and set without being changed, even when the moving robot 100 moves or rotates, while the function of generating the map is executed.

For example, after a plurality of movement directions are set, when the moving robot 100 rotates counterclockwise, the direction in which the front surface of the moving robot 100 faces may be the second movement direction, and when the moving robot 100 moves straight, the travel direction of the moving robot 100 may be the second movement direction.

Meanwhile, in this drawing, although it is described that a plurality of movement directions are set to four directions, the present disclosure is not limited thereto, and may be set to various numbers of directions, such as eight directions, sixteen directions, according to various embodiments.

The map generation module 352 may, for example, generate a map, based on an image acquired through the image acquisition unit 320. For example, the map generation module 352 may generate a map based on the acquisition image acquired through the image acquisition unit 320 while the moving robot 100 is driving.

The map generation module 352 may detect, for example, various features such as light, edge, corner, blob, ridge positioned in a traveling area included in each of the acquisition images acquired through the image acquisition unit 320.

The map generation module 352 may include, for example, a feature detector that detects feature from the acquisition image. For example, the feature detector may include Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR, Grey-level blobs detector, etc.

The map generation module 352 may, for example, generate a map, based on features of the traveling area detected from the acquisition image. Meanwhile, according to various embodiments of the present disclosure, an operation of detecting feature from the acquisition image may be performed by the position recognition module 353.

The map generation module 352 may, for example, generate a map based on information acquired through the lidar sensor 175.

For example, the map generation module 352 may analyze a reception pattern such as a reception time difference and a signal intensity of a laser that is output through the lidar sensor 175 and reflected by an external object and received, and then may acquire terrain information of the traveling area. The terrain information of the traveling area may include, for example, the position, distance, direction, etc. of objects existing around the moving robot 100.

The map generation module 352, for example, may generate a node based on the terrain information of the traveling area acquired through the lidar sensor 175, and may generate a global topological map including the generated node. Detailed descriptions thereof will be described later with reference to FIGS. 4A, 4B, 5A to 5J, and 6A to 6F.

The position recognition module 353 may, for example, determine the position of the moving robot 100. The position recognition module 353 may, for example, determine the position of the moving robot 100 while the moving robot 100 is traveling.

The position recognition module 353 may, for example, determine the position of the moving robot 100 based on the acquisition image acquired through the image acquisition unit 320.

For example, while the moving robot 100 is traveling, the position recognition module 353 may map features for each position of the traveling area detected from the acquisition image to each position of the generated in the map generation module 352, and may store data on features for each position of the traveling area mapped to each position on the map in the storage unit 305 as position recognition data.

Meanwhile, for example, the position recognition module 353 may compare the features of the traveling area detected from the acquisition image with the features of each position of the traveling area included in the position recognition data stored in the storage unit 305, calculate similarity (probability) for each position, and may determine the position having the greatest similarity as a position of the moving robot 100 based on the calculated similarity (probability) for each position.

Meanwhile, the moving robot 100 may, for example, determine the current position by learning the map through the traveling control module 351, the map generation module 352 and/or the obstacle recognition module 354 without the position recognition module 353.

The obstacle recognition module 354 may, for example, detect an obstacle around the moving robot 100. For example, the obstacle recognition module 354 may detect an obstacle around the moving robot 100, based on the acquisition image acquired through the image acquisition unit 320 and/or sensing data acquired through the sensor unit 370.

For example, the obstacle recognition module 354 may detect an obstacle around the moving robot 100, based on the terrain information of the traveling area acquired through the lidar sensor 175.

The obstacle recognition module 354 may, for example, determine whether there is an obstacle that prevents the moving robot 100 from traveling, while the moving robot 100 is traveling.

The obstacle recognition module 354 may, for example, determine a traveling pattern such as a straight movement, a rotation, or the like according to the attribute of the obstacle, and transmit the determined traveling pattern to the traveling control module 351, when it is determined that an obstacle exists.

For example, when the attribute of the obstacle is an obstacle (e.g. a projecting object existing in the floor) of a type which allows the moving robot 100 to travel, the obstacle recognition module 354 may determine the traveling pattern to allow the moving robot 100 to continue to travel.

Alternatively, for example, when the attribute of the obstacle is an obstacle (e.g. a wall, furniture, etc.) of a type which allows the moving robot 100 not to travel, the obstacle recognition module 354 may determine the traveling pattern to allow the moving robot 100 to rotate.

The moving robot 100 according to an embodiment of the present disclosure may perform human recognition, object recognition, and avoidance based on machine learning. Here, machine learning may mean that a computer learns through data and the computer solves a problem through the learning even though a person does not directly instruct logic to the computer.

Deep learning is a scheme of teaching a computer human's way of thinking based on artificial neural networks (ANN) for constructing artificial intelligence, and may mean an artificial intelligence technology that a computer can learn like a person on its own without a teaching by a person.

The artificial neural network (ANN) may be implemented in a software form or a hardware form such as a chip.

The obstacle recognition module 354 may, for example, include an artificial neural network (ANN) in the form of software or hardware in which an attribute of an obstacle is learned.

For example, the obstacle recognition module 354 may include a deep neural network (DNN) such as a convolutional neural network (CNN), a recurrent neural network (RNN), and a deep belief network (DBN) learned through deep learning.

The obstacle recognition module 354 may, for example, determine an attribute of an obstacle included in image data inputted based on weights between nodes included in the deep neural network (DNN).

The obstacle recognition module 354 may, for example, determine the attribute of the obstacle existing in the movement direction not by using an entire image acquired by the image acquisition unit 320, in particular, the front camera sensor 120a, but by using only a partial area.

In addition, the traveling control module 351 may, for example, control driving of the traveling unit 360 based on the recognized attribute of the obstacle.

The storage unit 330 may store, for example, input data for determining obstacle attribute and data for learning the deep neural network (DNN).

In the storage unit 330, for example, an original image acquired by the image acquisition unit 320 and extracted images containing an extracted certain area may be stored.

In the storage unit 330, for example, weights and biases constituting a deep neural network (DNN) structure may be stored.

For example, weights and biases constituting the deep neural network structure may be stored in an embedded memory of the obstacle recognition module 354.

The obstacle recognition module 354 may, for example, perform a learning process by using the extracted image as training data whenever a partial area of the image acquired by the image acquisition unit 320 is extracted, or may perform a learning process after a certain number of extracted images or more are acquired.

That is, the obstacle recognition module 354 may, for example, update the deep neural network (DNN) structure such as weight by adding a recognition result whenever an obstacle is recognized, or may update a deep neural network (DNN) structure such as a weight by performing a learning process using secured training data after a certain number of training data are secured.

Alternatively, the moving robot 100, for example, may transmit an original image or an extracted image acquired by the image acquisition unit 320 through the communication unit 390 to a certain server, and may receive data related to machine learning from a certain server.

In this case, the moving robot 100 may update the obstacle recognition module 354 based on data related to machine learning received from a certain server.

Figure 4A:
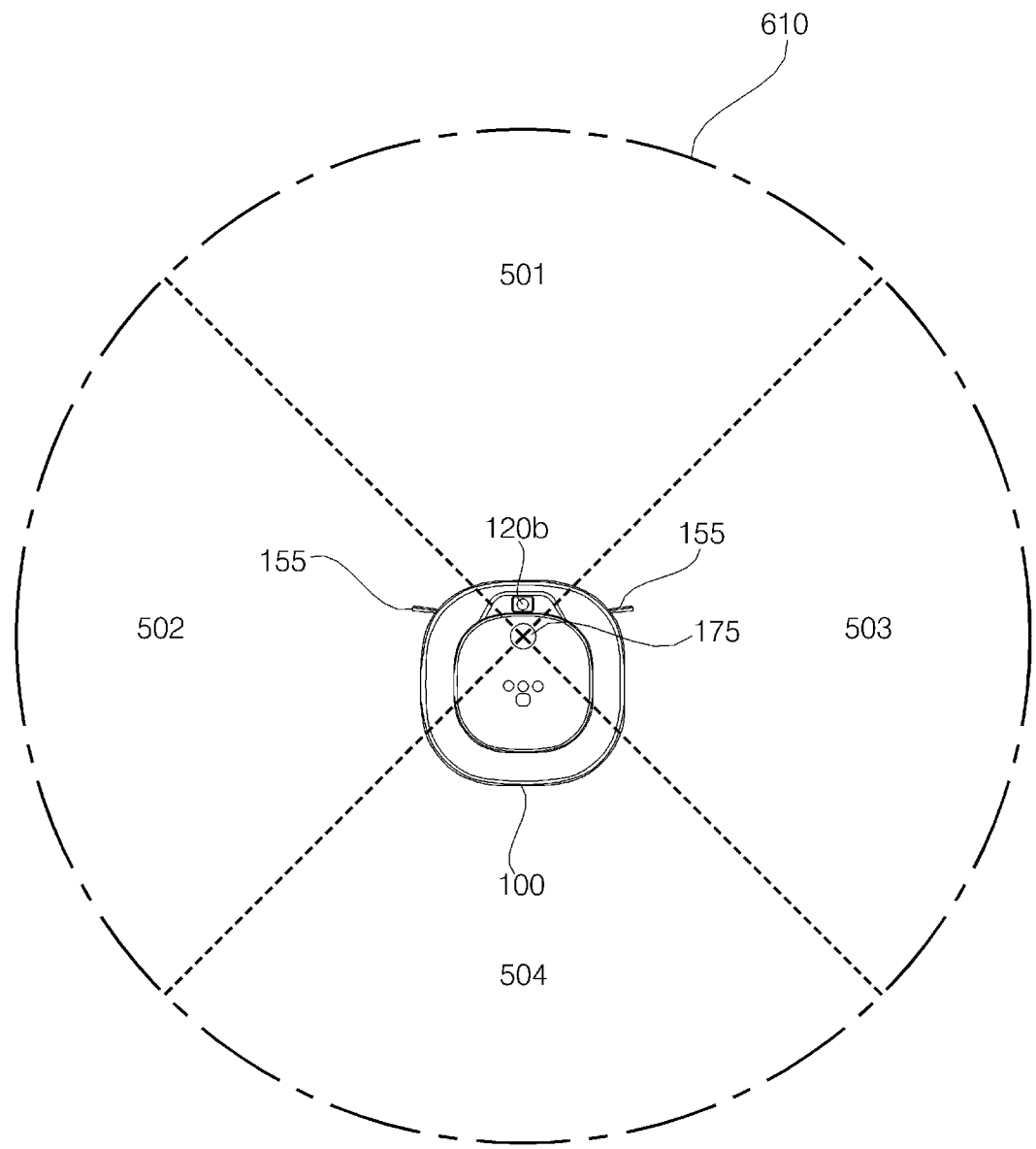
FIG. 4A is a diagram for explaining a lidar sensor provided in a moving robot, according to an embodiment of the present disclosure.

FIG. 4A is a diagram for explaining a lidar sensor 175 provided in a moving robot 100, according to an embodiment of the present disclosure.

Referring to FIG. 4A, the lidar sensor 175 may, for example, output a laser in an entire 360-degree directions, may acquire information such as distance to an object reflecting the laser, position direction, material by receiving the laser reflected from the object, and thus, may acquire terrain information of a traveling area.

The moving robot 100 may, for example, acquire terrain information within a certain distance according to the performance and setting of the lidar sensor 175. For example, the moving robot 100 may acquire terrain information within a circular area 610 having a radius of a certain distance based on the lidar sensor 175.

The moving robot 100 may, for example, classify the circular area 610 according to a plurality of movement directions. For example, when a plurality of movement directions are set to four directions, the circular area 610 may be divided into four areas corresponding to first movement direction 501 to fourth movement direction 504, and terrain information on traveling area may be classified for each area.

Figure 4B:
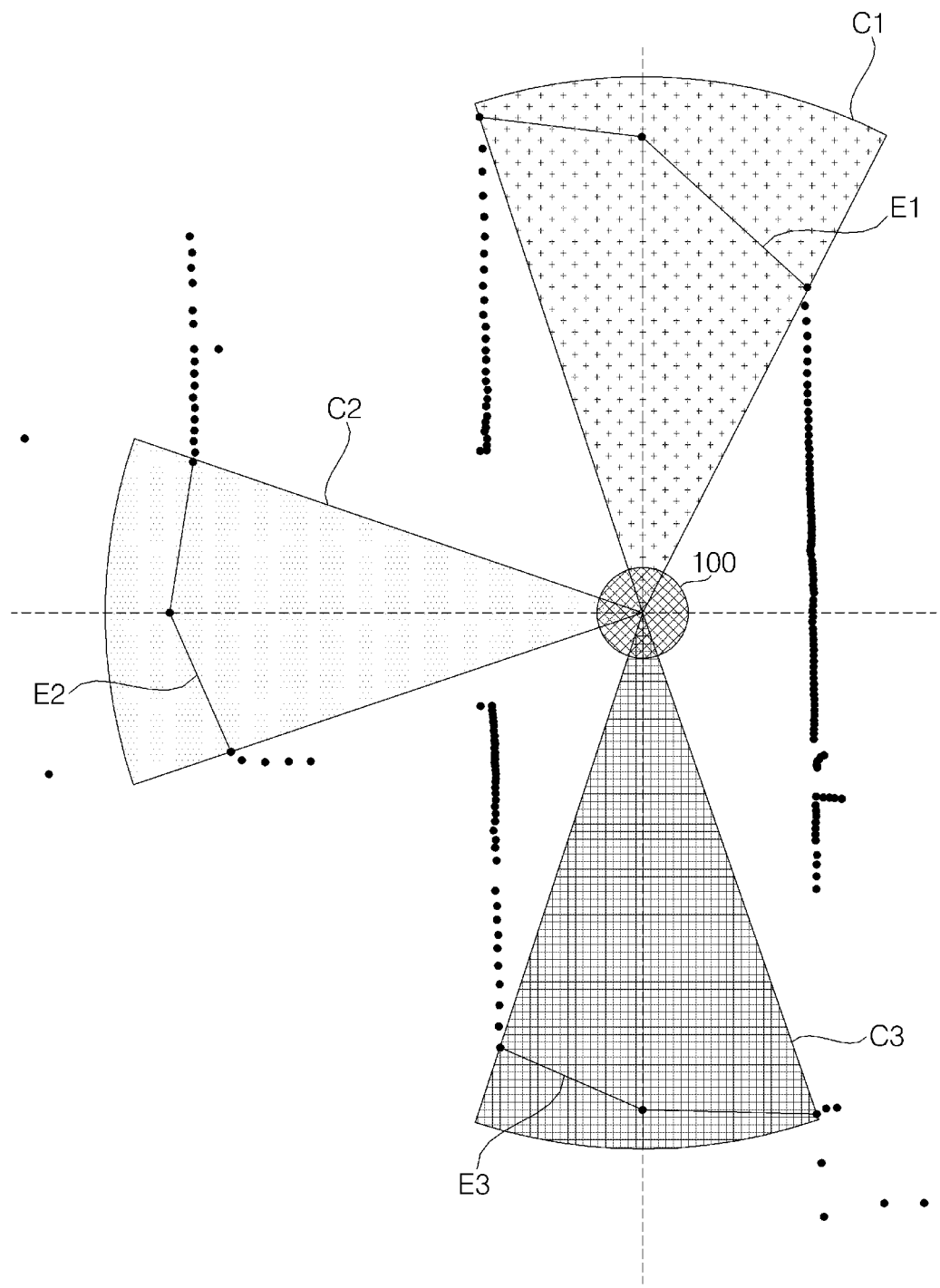
FIG. 4B is a diagram for explaining the traveling of a moving robot, according to an embodiment of the present disclosure.

FIG. 4B is a diagram for explaining the traveling of a moving robot, according to an embodiment of the present disclosure.

Referring to FIG. 4B, the moving robot 100 may acquire terrain information on the traveling area. For example, the moving robot 100 may acquire terrain information on the traveling area through the lidar sensor 175 while traveling according to a traveling command.

The moving robot 100 may extract a free edge from terrain information on four movement directions acquired through the lidar sensor 175. Here, the free edge may, for example, mean information related to a space, between objects reflecting a laser, in which the moving robot 100 can travel.

As shown in FIG. 4B, with respect to each movement direction, the moving robot 100 may extract a free edge based on an arc drawn by the circular area 610 having a radius of a certain distance, based on both end points of the movement passage and the lidar sensor 175.

The free edge E1, E2, E3 may include the width of the movement passage in each movement direction, position information of the movement passage, information related to a center point of the movement passage, and the like and may also include information related to an angle between both end points of the movement passage and a center line of the moving robot 100. Here, the center line of the moving robot 100 may mean, for example, a straight line extended toward a plurality of movement directions, based on the moving robot 100.

Meanwhile, the moving robot 100 may extract a feature point (hereinafter, an edge) corresponding to an obstacle such as a wall surface from a free edge. At this time, the moving robot 100 may determine the width of the movement passage, a gap between obstacles, and the like, based on a gap between the edges.

Meanwhile, in order to move along the center of the movement passage, the moving robot 100 may detect a center point of the movement passage based on the free edge, and may travel according to the center point.

FIG. 5A to FIG. 5J are diagrams for explaining the operation of the moving robot 100, according to an embodiment of the present disclosure. The operation of the moving robot 100 explained in the present drawing may be understood as an operation of components (e.g. the controller 350 of FIG. 3) provided in the moving robot 100.

Figure 5A:
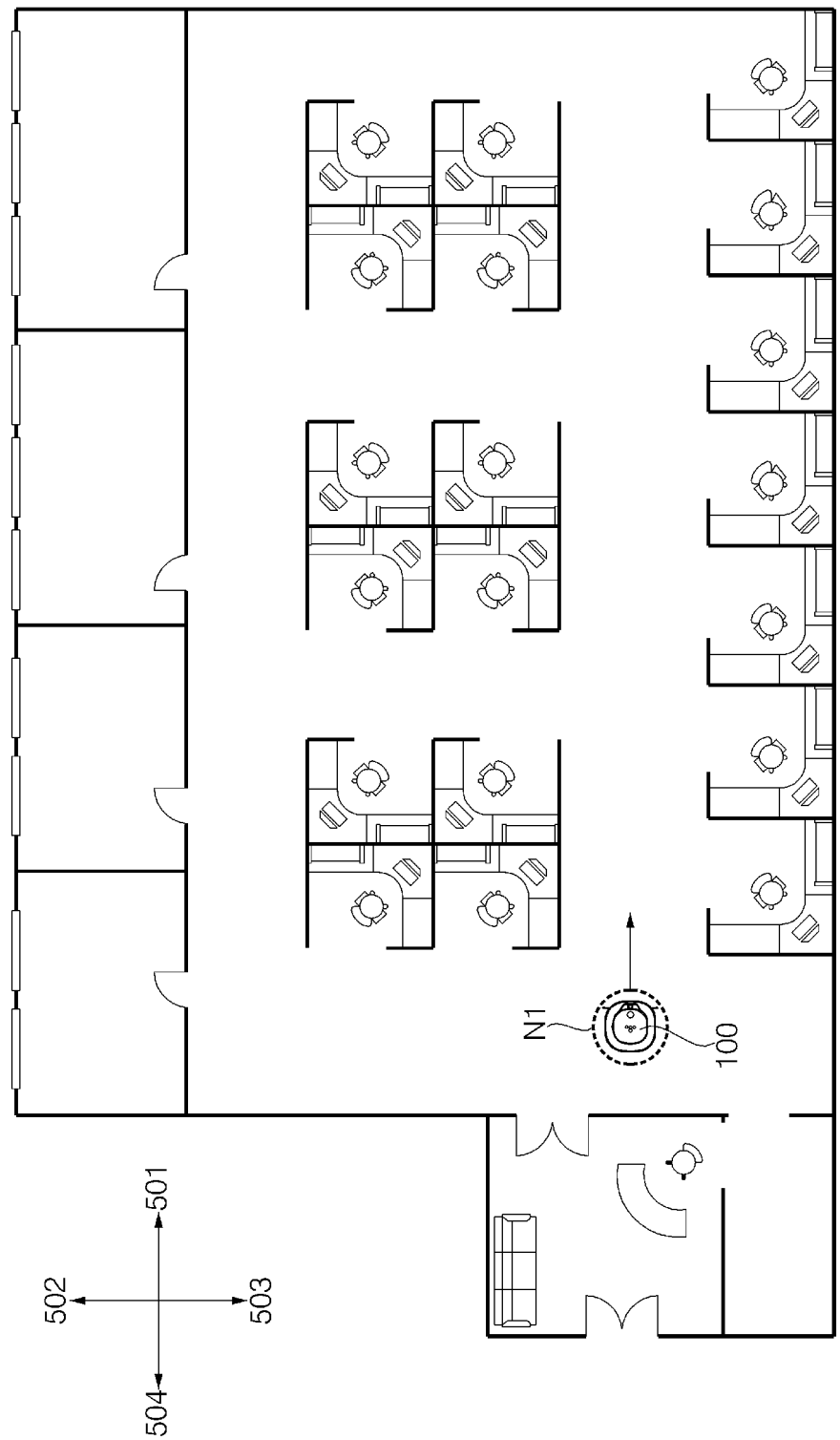
FIG. 5A to FIG. 5J are diagrams for explaining the operation of a moving robot, according to an embodiment of the present disclosure.

Referring to FIG. 5A, the moving robot 100 may set a plurality of movement directions when the map generation function is executed.

For example, when the map generation function is executed, the moving robot 100 may set the direction in which the front surface of the moving robot 100 faces at the time when the map generation function is executed as a first movement direction 501, set the direction in which the left side surface of the moving robot 100 faces as a second movement direction 502, set the direction in which the right side surface of the moving robot 100 faces as a third movement direction 503, and set the direction in which the rear surface of the moving robot 100 faces, which is the opposite direction of the first direction, as a fourth movement direction 504.

Meanwhile, when the map generation function is executed, the moving robot 100 may adjust the position of the moving robot 100, and may set a plurality of movement directions 501 to 504 based on the adjusted position.

For example, the moving robot 100 may detect the feature (e.g. direction of ceiling) of the image of the ceiling, through an upper camera (e.g. the upper camera 120b of FIG. 1A) for acquiring an image of the ceiling in the traveling area, and may adjust the position of the moving robot 100 based on the detected feature.

Meanwhile, when the map generation function is executed, the moving robot 100 may generate a first node N1 corresponding to the current position of the moving robot 100. For example, the moving robot 100 may set the coordinate of the first node N1 to (0, 0), and set the coordinate of a later generated node based on the coordinate of the first node N1. Here, the coordinate of node may be, for example, a coordinate on a coordinate plane.

The moving robot 100 may determine whether an open movement direction exists among a plurality of movement directions 501 to 504, through the lidar sensor (e.g. the lidar sensor 175 of FIG. 4A).

Here, the open movement direction may mean, for example, a movement direction in which the moving robot 100 is able to travel, and the moving robot 100 has not previously traveled.

For example, when there is an obstacle (e.g. a wall surface) of a type which allows the moving robot 100 not to travel within a certain distance (e.g., 3 m) from the moving robot 100, or when the width of the movement passage is less than a certain reference width which allows the moving robot 100 to travel, the moving robot 100 may determine that traveling is impossible.

Figure 5B:
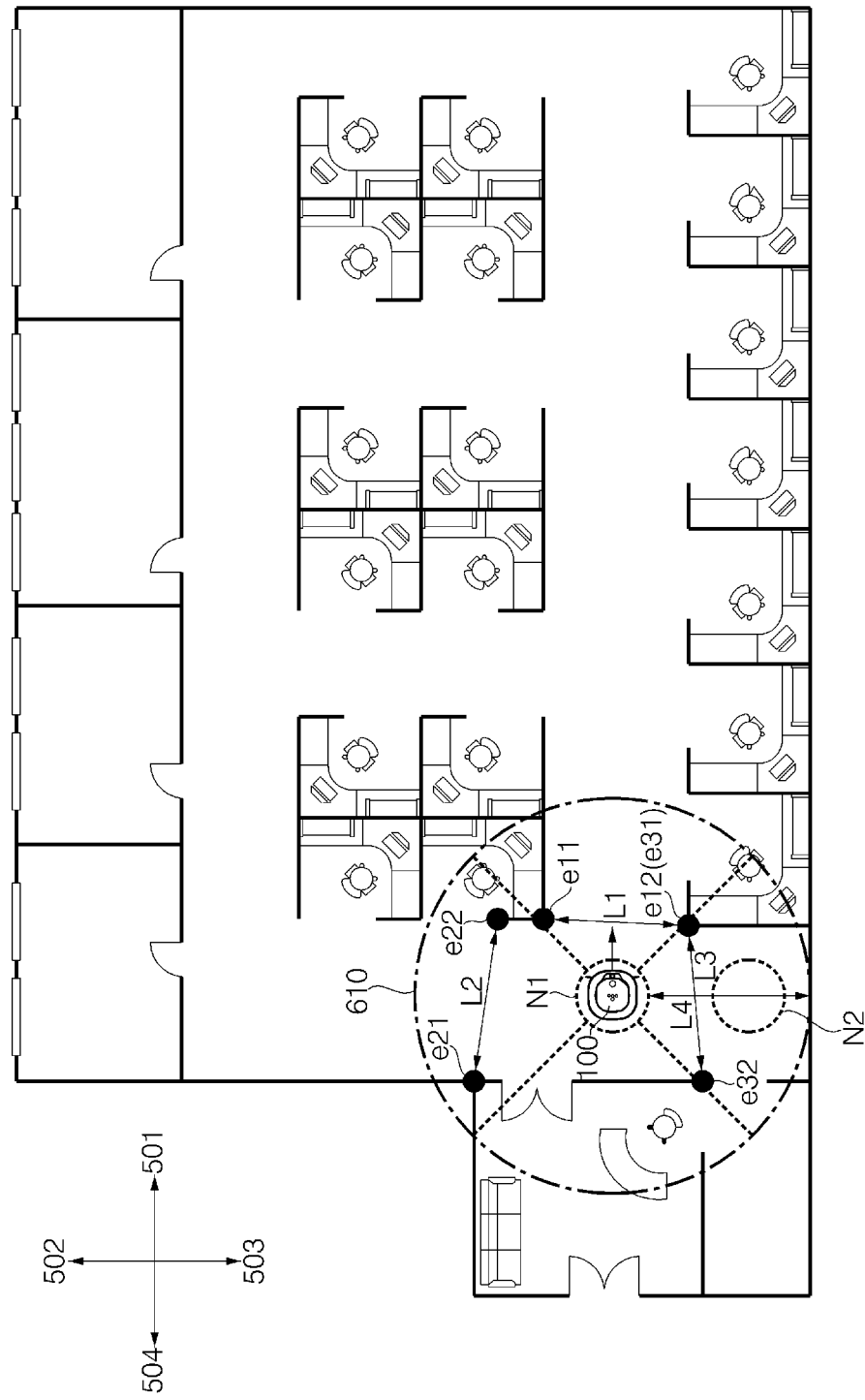

Referring to FIG. 5B, the moving robot 100 may check each width of the movement passage with respect to a plurality of movement directions 501 to 504, based on terrain information of the traveling area within a certain distance 610, acquired through the lidar sensor 175.

The moving robot 100 may determine an edge that becomes a reference for calculating the width of the movement passage in each area corresponding to the plurality of movement directions 501 to 504, and may check the width of the movement passage based on a gap between the edges.

At this time, when the width of the movement passage is greater than or equal to a reference width (e.g. the diameter of the moving robot 100), the moving robot 100 may determine that the movement passage is possible to travel.

The moving robot 100 may determine two edges e11 and e12 in an area corresponding to a first movement direction 501, and may determine that the width L1 of the movement passage with respect to the first movement direction 501 is greater than or equal to the reference width, based on the distance L1 between two edges e11 and e12.

Meanwhile, it can be seen that the width L3 of the movement passage with respect to a third movement direction 503 is greater than or equal to the reference width, but an obstacle (e.g., a wall surface) of a type which allows the moving robot 100 not to travel exists within a certain distance 610 to the moving robot 100.

In addition, also in a fourth movement direction 504, it can be seen that an obstacle (e.g., a wall surface) of a type which allows the moving robot 100 not to travel exists within a certain distance 610 to the moving robot 100.

Accordingly, the moving robot 100 may determine the first movement direction 501 and the second movement direction 502 as an open movement direction.

The moving robot 100 may, for example, determine whether an open movement direction exists among the plurality of movement directions 501 to 504, and may generate a node based on the determination result.

For example, if the current travel direction of the moving robot 100 is not included in the open movement direction, or when a plurality of movement directions including the current travel direction of the moving robot 100 are included in the open movement direction, the moving robot 100 may generate a node.

Meanwhile, for example, when only the movement direction set as the current travel direction of the moving robot 100 is open, the moving robot 100 may move straight according to the set travel direction without generating a node.

Meanwhile, for example, the moving robot 100 may not generate a node, when a node corresponding to the current position exists. At this time, since the first node N1 is generated in FIG. 5A, the moving robot 100 may not generate a node.

Meanwhile, in FIG. 5A, when the map generation function is executed, it is described that the moving robot 100 generates the first node N1 in correspondence with the current position of the moving robot 100, but the present disclosure is not limited thereto.

Therefore, when the map generation function is executed, since the travel direction of the moving robot 100 is not set, the current travel direction of the moving robot 100 is not included in the open movement direction. Thus, the moving robot 100 may generate the first node N1 after determining whether an open movement direction exists among the plurality of movement directions 501 to 504.

The moving robot 100 may, for example, determine the direction in which the front surface of the moving robot 100 faces at a time when the map generation function is executed as a travel direction.

The moving robot 100 may, for example, determine any one of the open movement directions as the travel direction. The moving robot 100 may, for example, check the cost of each of the open movement directions, and compare the costs of the open movement directions to determine the travel direction. Here, the cost may include, for example, the width of the movement passage for each open movement direction, a setting state on whether it is set as the current travel direction, or the like.

For example, the moving robot 100 may compare the width of the movement passage for each of the open movement directions, and determine the movement direction of the movement passage having the widest width as the travel direction. In the drawing, since the width L1 of the movement passage for the first movement direction 501 is the widest, the first movement direction 501 may be determined as the travel direction.

Meanwhile, for example, the moving robot 100 may maintain the movement direction set as the current travel direction among the open movement directions as the travel direction.

Meanwhile, the data for the node stored in the moving robot 100 will be described with reference to Table 1 below.

TABLE 1

| Node | X coordinate (cm) | Y coordinate (cm) | First movement direction (501) | Second movement direction (502) | Third movement direction (503) | Fourth movement direction (504) |
| --- | --- | --- | --- | --- | --- | --- |
| N1 | 0 | 0 | −2(open) | −2(open) | −1 | −1 |

Referring to Table 1, the coordinate of the first node N1 may be set to (0, 0), the first and second movement directions 501 and 502 may be set to '−2' indicating that they are opened, and the third and fourth movement directions 503 and 504 may be set to '−1' indicating that they are not opened. Meanwhile, in the drawing, the reference value of the coordinate is described in centimeters (cm), but the present disclosure is not limited thereto.

Meanwhile, in the case of the third movement direction 503, an obstacle (e.g. a wall surface) of a type that allows the moving robot 100 not to travel exists within a certain distance 610 to the moving robot 100. However, since the width L3 of the movement passage is greater than or equal to the reference width, and a area in which the moving robot 100 can travel exists, the second node N2 may be generated in a position spaced by a certain distance from the first node N1 in the third movement direction 503. At this time, the position of the generated node may be determined, for example, in consideration of the distance L4 between the moving robot 100 and an obstacle.

Data for the first node N1 and the second node N2 may be set as shown in Table 2 below.

TABLE 2

| Node | X coordinate (cm) | Y coordinate (cm) | First movement direction (501) | Second movement direction (502) | Third movement direction (503) | Fourth movement direction (504) |
|---|---|---|---|---|---|---|
| N1 | 0 | 0 | −2(open) | −2(open) | 2 | −1 |
| N2 | 0 | −200 | −1 | 1 | −1 | −1 |

Referring to Table 2, as the second node N2 is generated in the third movement direction 503 of the first node N1, the data value for the third movement direction 503 of the first node N1 may be updated to '2' indicating the second node N2.

Meanwhile, the coordinate of the second node N2 may be set to (0, −200), and as the first node N1 is positioned in the second movement direction 502, the data value for the second movement direction 502 of the second node N2 may be set to '1'.

The moving robot 100 may travel in the first movement direction determined as the travel direction. The moving robot 100 may travel along a center of the movement passage while traveling in the movement passage of the travel direction.

For example, while traveling in the movement passage of the travel direction, the moving robot 100 may detect a center point of the movement passage based on an edge that is a reference for calculating the width of the movement passage, and may travel according to the center point.

Meanwhile, the moving robot 100 may determine whether an open movement direction exists among the plurality of movement directions 501 to 504, while traveling in the movement passage of the travel direction. For example, the moving robot 100 continuously determines whether an open movement direction exists among the plurality of movement directions 501 to 504 according to a certain cycle, while traveling in the movement passage of the travel direction.

Figure 5C:
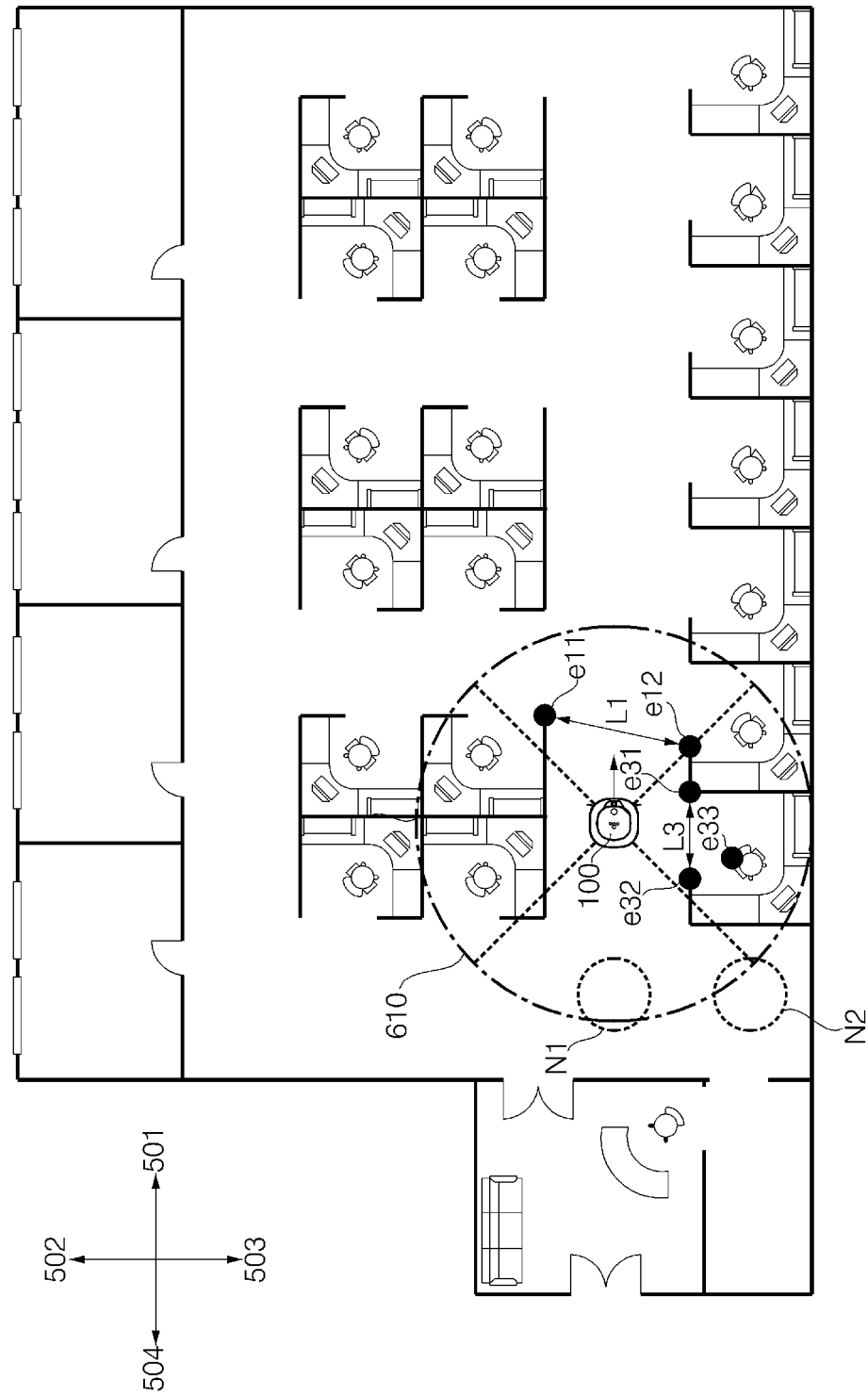

Referring to FIG. 5C, the width L3 of the movement passage with respective to the third movement direction 503 is greater than or equal to the reference width, but it can be seen that an obstacle e33 of a type that allows the moving robot 100 not to travel exists within a certain distance 610 to the moving robot 100.

Meanwhile, since the fourth movement direction 504 corresponds to an opposite direction to the travel direction, and corresponds to the movement direction in which the moving robot 100 has previously traveled, the moving robot 100 may determine as the movement direction that is not open.

Therefore, the moving robot 100 may check that among the plurality of movement directions 501 to 504, only the first movement direction 501, which is the travel direction, is open, and may continue to travel in the current travel direction.

Figure 5D:
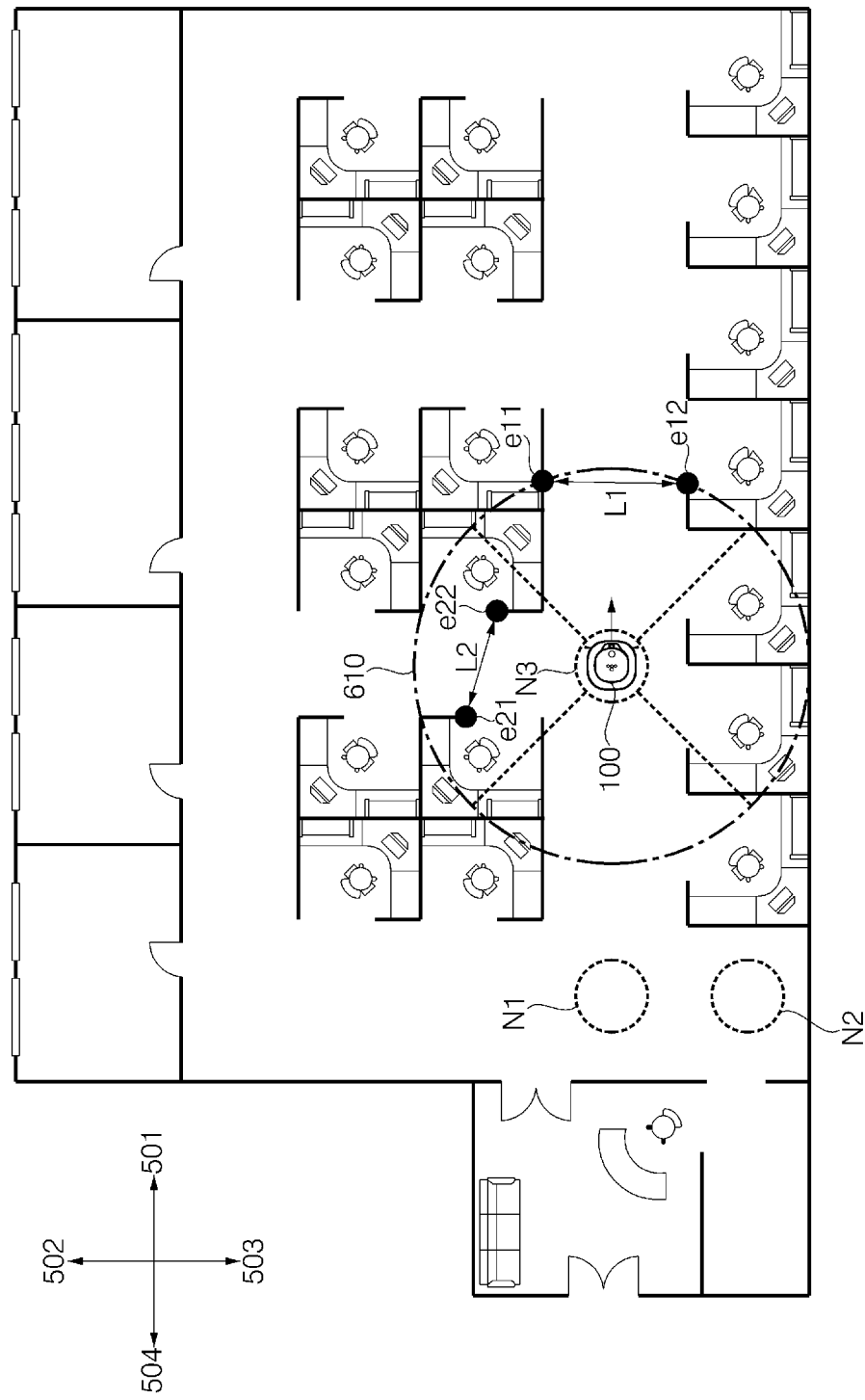

Referring to FIG. 5D, while traveling in the movement passage of the travel direction, the moving robot 100 may check that the first and second movement directions 501 and 502 among the plurality of movement directions 501 to 504 are the open movement direction.

Since the plurality of movement directions including the first travel direction 501 that is the current travel direction correspond to the open movement direction, the moving robot 100 may generate a third node N3.

Data for the first node N1 to the third node N3 may be set as shown in Table 3 below.

TABLE 3

| Node | X coordinate (cm) | Y coordinate (cm) | First movement direction (501) | Second movement direction (502) | Third movement direction (503) | Fourth movement direction (504) |
|---|---|---|---|---|---|---|
| N1 | 0 | 0 | 3 | −2(open) | 2 | −1 |
| N2 | 0 | −200 | −1 | 1 | −1 | −1 |
| N3 | 400 | 0 | −2(open) | −2(open) | −1 | 1 |

Referring to Table 3, as the third node N3 is generated in the first movement direction 501 of the first node N1, the data value for the first movement direction 501 of the first node N1 may be updated to '3' indicating the third node N3.

Meanwhile, the coordinate of the third node N3 may be set to (400, 0) based on the travel distance of the moving robot 100. As the first node N1 is positioned in the fourth movement direction 504, the data value for the fourth movement direction 504 of the third node N3 may be set to '1' indicating the first node N1.

The moving robot 100 may compare the widths L1 and L2 of the movement passages with respect to the open first and second movement directions 501 and 502, respectively, and decide the first movement direction 501 in the travel direction.

Figure 5E:
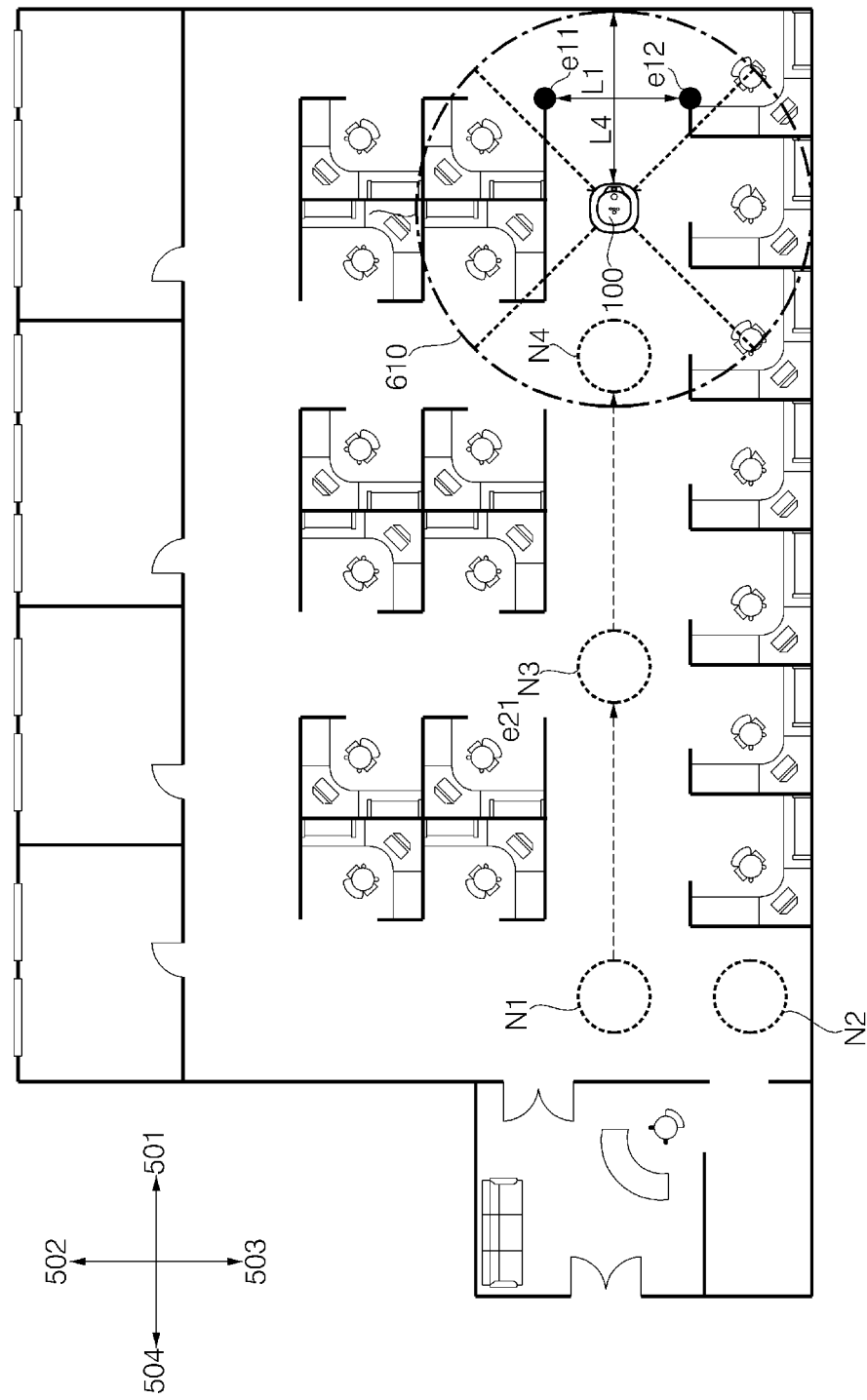

Referring to FIG. 5E, the moving robot 100 may generate the fourth node N4 in the same manner as generating the third node N3 in FIG. 5D, while traveling according to the travel direction.

Meanwhile, data for the first node N1 to the fourth node N4 may be set as shown in Table 4 below.

TABLE 4

| Node | X coordinate (cm) | Y coordinate (cm) | First movement direction (501) | Second movement direction (502) | Third movement direction (503) | Fourth movement direction (504) |
|---|---|---|---|---|---|---|
| N1 | 0 | 0 | 3 | −2(open) | 2 | −1 |
| N2 | 0 | −200 | −1 | 1 | −1 | −1 |
| N3 | 400 | 0 | 4 | −2(open) | −1 | 1 |
| N4 | 800 | 0 | −2(open) | −2(open) | −1 | 3 |

Referring to Table 4, as the fourth node N4 is generated in the first movement direction 501 of the third node N3, the data value for the first movement direction 501 of the third node N3 may be updated to '4' indicating the fourth node N4.

Meanwhile, the coordinate of the fourth node N4 may be set to (800, 0) based on the travel distance of the moving robot 100, and as the third node N3 is positioned in the fourth movement direction 504, the data value for the fourth movement direction 504 of the fourth node N4 may be set to '3' indicating the third node N3.

Meanwhile, while traveling according to the travel direction, the moving robot 100 may check that an obstacle (e.g., a wall surface) of a type which allows the moving robot 100 not to travel exists within a certain distance 610 with respect to the first movement direction 501 that is a travel direction.

At this time, since the moving robot 100 is in a state of traveling according to the traveling direction, and the width L1 of the moving passage is greater than or equal to the reference width, unlike generating the second node N2 in FIG. 5B, it may continue to move until approaching an obstacle.

Even when the moving robot 100 approaches the obstacle, if the open movement direction does not exist among the plurality of movement directions 501 to 504, the moving robot 100 may generate a new node in a position approaching the obstacle.

In addition, the moving robot 100 may determine whether there is a node that needs to be updated among the nodes, based on data for the node. Here, the node that needs to be updated, for example, among the data values related with the node, when a node including '−2' indicating open exists, a corresponding node may be determined to be a node that needs to be updated.

Figure 5F:
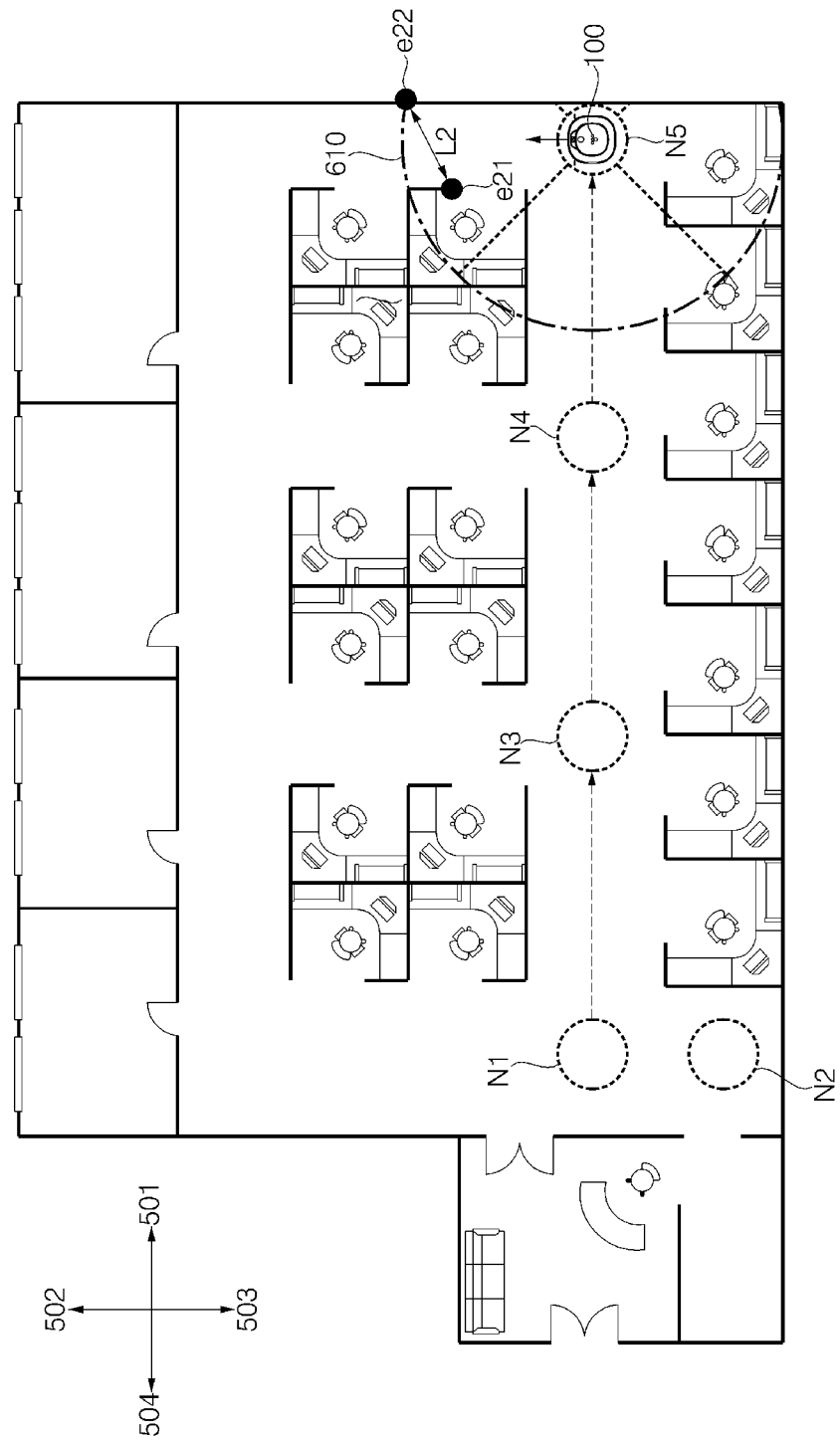

Meanwhile, as shown in FIG. 5F, while the moving robot 100 approaches the obstacle, if it is checked that among the plurality of movement directions 501 to 504, the first movement direction 501 that is the travel direction is not opened and the other movement direction 502 is open, the moving robot 100 may generate a fifth node N5.

Meanwhile, data for the first node N1 to the fifth node N3 may be set as shown in Table 5 below.

TABLE 5

| Node | X coordinate (cm) | Y coordinate (cm) | First movement direction (501) | Second movement direction (502) | Third movement direction (503) | Fourth movement direction (504) |
|---|---|---|---|---|---|---|
| N1 | 0 | 0 | 3 | −2(open) | 2 | −1 |
| N2 | 0 | −200 | −1 | 1 | −1 | −1 |
| N3 | 400 | 0 | 4 | −2(open) | −1 | 1 |
| N4 | 800 | 0 | 5 | −2(open) | −1 | 3 |
| N5 | 1100 | 0 | −1 | −2(open) | −1 | 4 |

Referring to Table 5, as the fifth node N5 is generated in the first movement direction 501 of the fourth node N4, the data value for the first movement direction 501 of the fourth node N4 may be updated to '5' indicating the fifth node N5.

Meanwhile, the coordinate of the fifth node N5 may be set to (1100, 0) based on the travel distance of the moving robot 100, and as the fourth node N4 is positioned in the fourth movement direction 504, the data value for the fourth movement direction 504 of the fifth node N5 may be set to '4' indicating the fourth node N4.

Meanwhile, among the plurality of movement directions 501 to 504, the moving robot 100 may determine the second movement direction 502 that is an open movement direction as a travel direction, and may travel in the second movement direction 502.

Figure 5G:
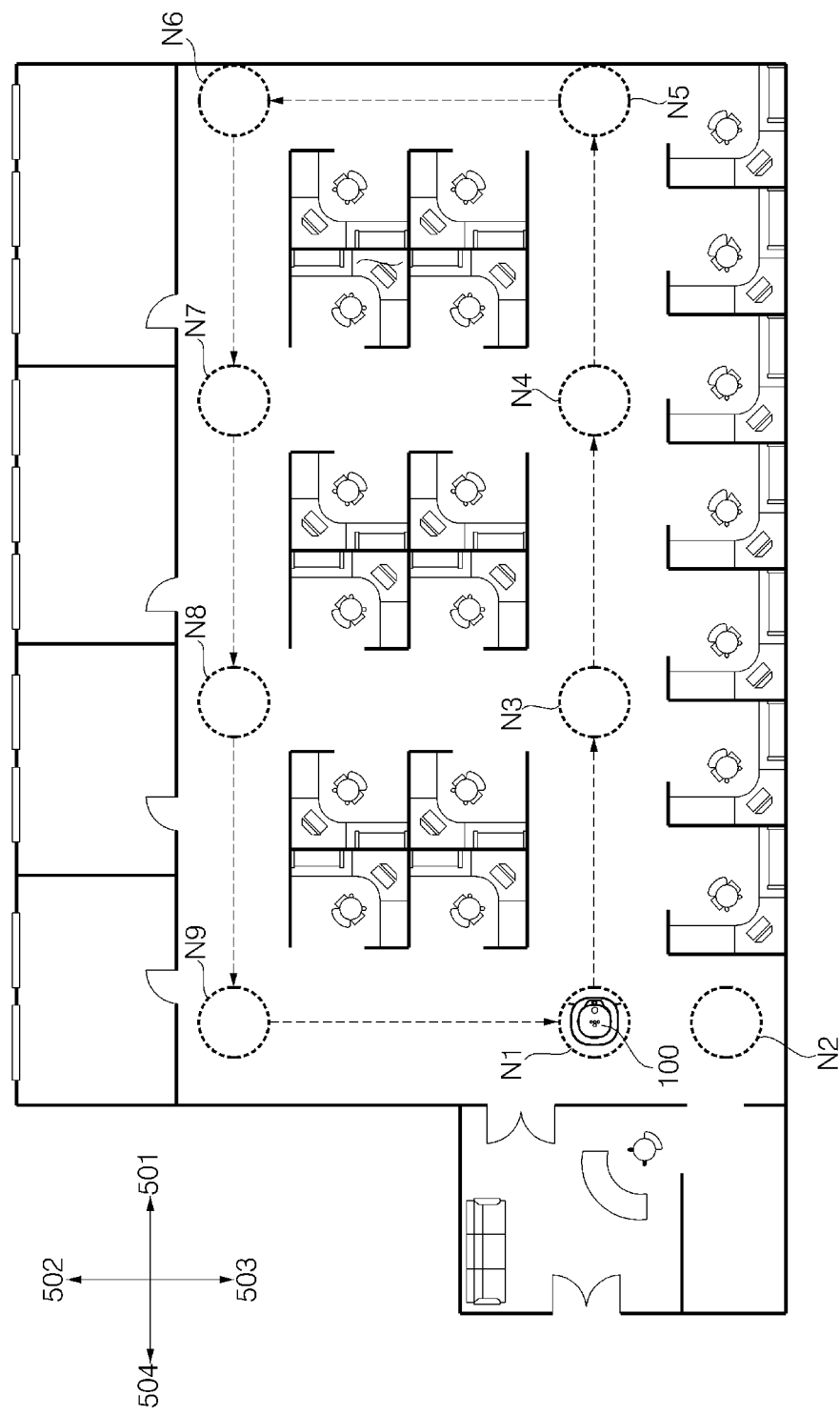

Referring to FIG. 5G, while traveling according to the travel direction, the moving robot 100 may generate sixth node N6 to ninth node N9 in the same manner as generating the third node N3 to the fifth node N5 in FIG. 5C to 5E.

At this time, in the drawings of the present disclosure, it is described on the basis that the doors installed in the entrances of all the spaces are closed, and when the doors are open, the movement path of the moving robot 100 may be different.

Meanwhile, Data for the first node N1 to the ninth node N9 may be set as shown in Table 6 below.

TABLE 6

| Node | X coordinate (cm) | Y coordinate (cm) | First movement direction (501) | Second movement direction (502) | Third movement direction (503) | Fourth movement direction (504) |
|---|---|---|---|---|---|---|
| N1 | 0 | 0 | 3 | 9 | 2 | −1 |
| N2 | 0 | −200 | −1 | 1 | −1 | −1 |
| N3 | 400 | 0 | 4 | −2(open) | −1 | 1 |
| N4 | 800 | 0 | 5 | −2(open) | −1 | 3 |
| N5 | 1100 | 0 | −1 | 6 | −1 | 4 |
| N6 | 1100 | 450 | −1 | −1 | 5 | 7 |
| N7 | 810 | 450 | 6 | −1 | −2(open) | 8 |
| N8 | 420 | 450 | 7 | −1 | −2(open) | 9 |
| N9 | 5 | 450 | 8 | −1 | 1 | −1 |

Meanwhile, while traveling in the third movement direction 503 from the ninth node (N9), it can be confirmed that the moving robot 100 returns to the first node (N1).

The moving robot 100 may check that there is no open movement direction in a position corresponding to the first node N1. At this time, since the first node N1 is previously set in a corresponding position, the moving robot 100 may not generate a new node, and may determine whether a node that needs to be updated exists among nodes, based on the data for node.

The moving robot 100 may move to any one of nodes that need to be updated, when a node that needs to be updated exists. At this time, the moving robot 100 may determine a node positioned in the shortest distance from the current position of the moving robot 100 among nodes that need to be updated.

For example, the moving robot 100 may check the distance between the nodes included in the data for the node, and determine the node positioned in the shortest distance from the current position of the moving robot 100.

Meanwhile, the moving robot 100 may determine whether an open movement direction exists among the plurality of movement directions 501 to 504, after moving to any one of nodes that need to be updated.

Referring to Table 6, the moving robot 100 may determine the third node (N3), the fourth node (N4), the seventh node (N7), and the eighth node (N8) that contain '-2' indicating an open state in the data value related with the node as a node that needs to be updated.

Figure 5H:
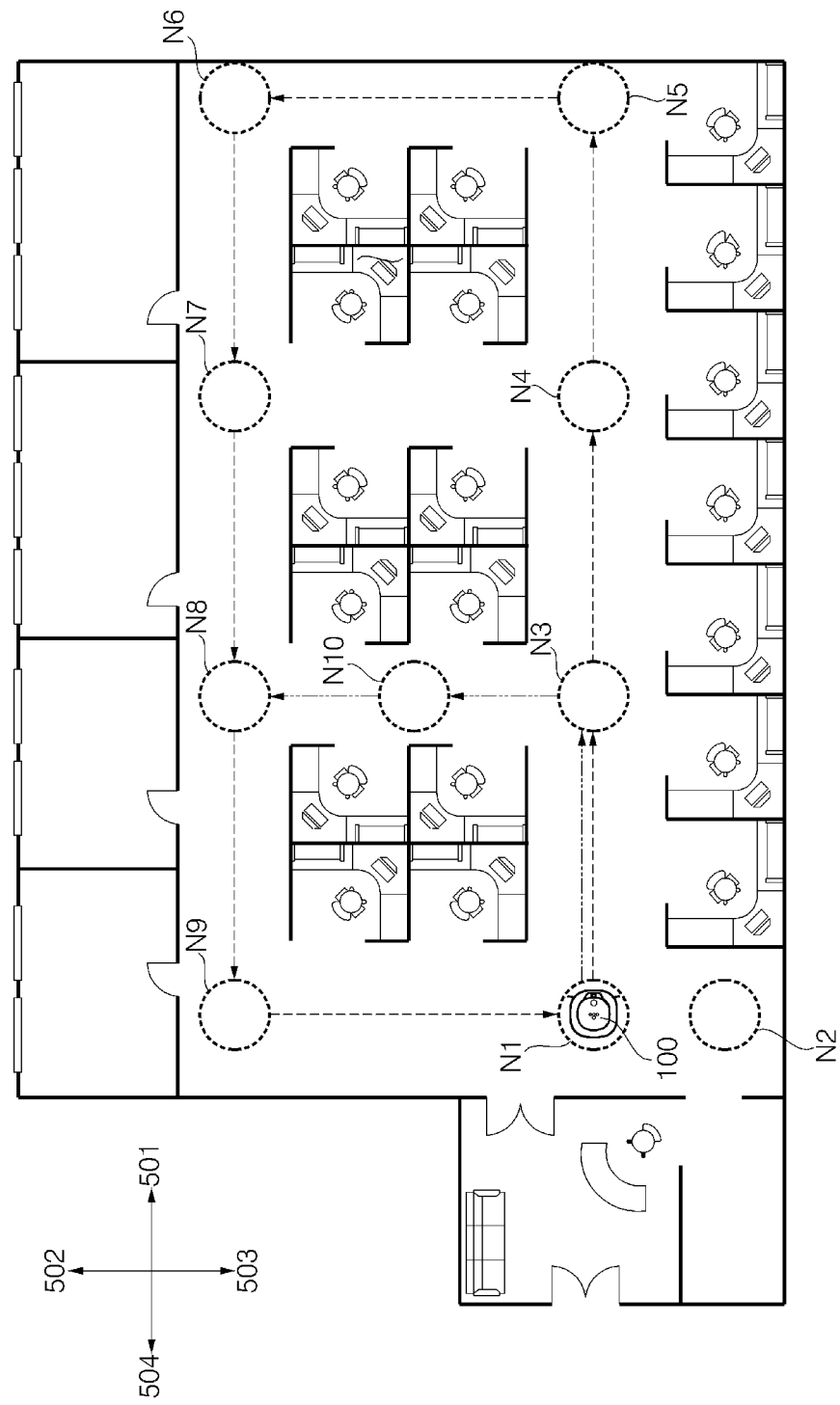

Referring to FIG. 5H, the moving robot 100 may move to the third node N3 positioned in the shortest distance among nodes that need to be updated, may determine the second movement direction 502, which is the open movement direction in the third node N3, as the driving direction, and may travel.

While traveling in the second movement direction 502, the moving robot 100 may check that only the second movement direction 502 that is the travel direction, among the plurality of movement directions 501 to 504, is opened, and may continue to travel in the current travel direction.

Meanwhile, the moving robot 100 may generate a new node according to a certain distance, when traveling only in a travel direction over a certain distance.

The moving robot 100 may generate a tenth node N10 while traveling in the travel direction.

For example, while traveling in the travel direction, the moving robot 100 may generate a new node, and may generate a more accurate map, if only the travel direction among the plurality of movement directions 501 to 504 is opened over a certain distance, The moving robot 100 may check that it has arrived in a position corresponding to the eighth node N8.

Data for the first node N1 to the tenth node N10 may be set as shown in Table 7 below.

TABLE 7

| Node | X coordinate (cm) | Y coordinate (cm) | First movement direction (501) | Second movement direction (502) | Third movement direction (503) | Fourth movement direction (504) |
|---|---|---|---|---|---|---|
| N1 | 0 | 0 | 3 | 9 | 2 | −1 |
| N2 | 0 | −200 | −1 | 1 | −1 | −1 |
| N3 | 400 | 0 | 4 | 10 | −1 | 1 |
| N4 | 800 | 0 | 5 | −2(open) | −1 | 3 |
| N5 | 1100 | 0 | −1 | 6 | −1 | 4 |
| N6 | 1100 | 450 | −1 | −1 | 5 | 7 |
| N7 | 810 | 450 | 6 | −1 | −2(open) | 8 |
| N8 | 420 | 450 | 7 | −1 | 10 | 9 |
| N9 | 5 | 450 | 8 | −1 | 1 | −1 |
| N10 | 400 | 220 | −1 | 8 | 3 | −1 |

The moving robot 100 may check that there is no open movement direction in a position corresponding to the eighth node N8. At this time, since the eighth node N8 is previously set in a corresponding position, the moving robot 100 may not generate a new node, and may determine whether a node that needs to be updated exists among nodes, based on the data for node.

Referring to Table 7, the moving robot 100 may determine the fourth node (N4) and the seventh node (N7) in which '-2' indicating an open state is contained in the data value related with the node as the node that needs to be updated.

Figure 5I:
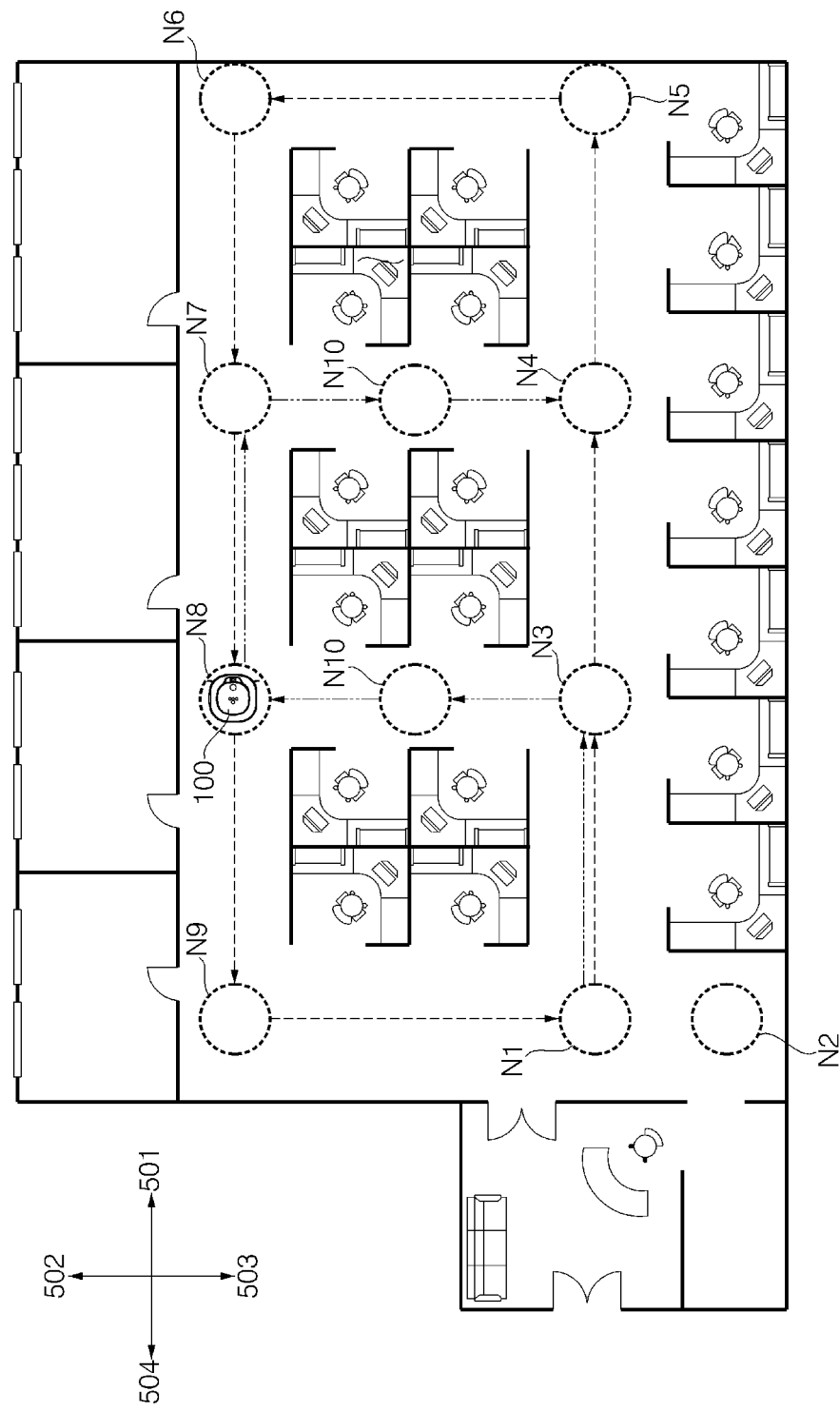

Referring to FIG. 5I, the moving robot 100 may move to the seventh node N7 positioned in the shortest distance among nodes that need to be updated, and determine the third movement direction 503, which is the open movement direction in the seventh node N7, as the traveling direction, and may travel.

As shown in FIG. 5H, while traveling in the third movement direction 503 which is the travel direction, it can be checked that only third movement direction 503 which is the travel direction, among the plurality of movement directions 501 to 504, is opened, and the moving robot 100 may continue traveling in the current travel direction.

Meanwhile, while traveling in the travel direction, the moving robot 100 may generate an eleventh node N11. The moving robot 100 may confirm that it has arrived in a position corresponding to the fourth node N4, and may confirm that the open movement direction does not exist in a position corresponding to the fourth node N4. In addition, since the fourth node N4 is previously set in a corresponding position, the moving robot 100 does not generate a new node, and may determine whether a node that needs to be updated exists among nodes, based on the data for node.

Meanwhile, data for the first node N1 to the eleventh node N11 may be set as shown in Table 8 below.

TABLE 8

| Node | X coordinate (cm) | Y coordinate (cm) | First movement direction (501) | Second movement direction (502) | Third movement direction (503) | Fourth movement direction (504) |
|---|---|---|---|---|---|---|
| N1 | 0 | 0 | 3 | 9 | 2 | −1 |
| N2 | 0 | −200 | −1 | 1 | −1 | −1 |
| N3 | 400 | 0 | 4 | 10 | −1 | 1 |
| N4 | 800 | 0 | 5 | 11 | −1 | 3 |
| N5 | 1100 | 0 | −1 | 6 | −1 | 4 |
| N6 | 1100 | 450 | −1 | −1 | 5 | 7 |
| N7 | 810 | 450 | 6 | −1 | 11 | 8 |
| N8 | 420 | 450 | 7 | −1 | 10 | 9 |
| N9 | 5 | 450 | 8 | −1 | 1 | −1 |
| N10 | 400 | 220 | −1 | 8 | 3 | −1 |
| N11 | 810 | 230 | −1 | 7 | 4 | −1 |

The moving robot 100 may check that the node that needs to be updated no longer exists, store the generated global topological map in the storage unit 305, and complete a map generation.

Figure 5J:
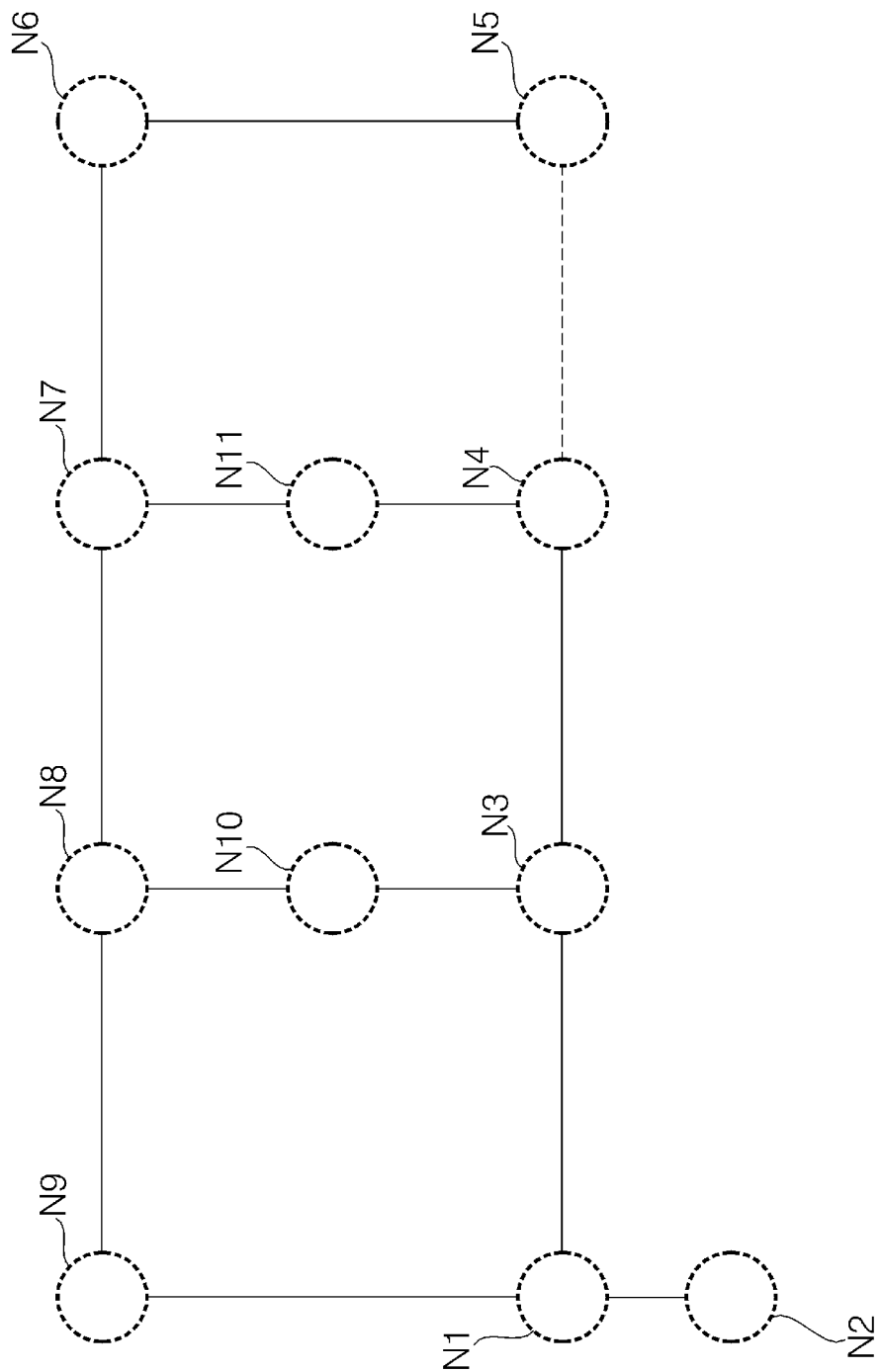

Referring to FIG. 5J, the moving robot 100 may check relationships between nodes and determine a movement path, based on the generated global topological map.

FIGS. 6A to 6F are diagrams for explaining the operation of the moving robot 100, according to another embodiment of the present disclosure.

Figure 6A:
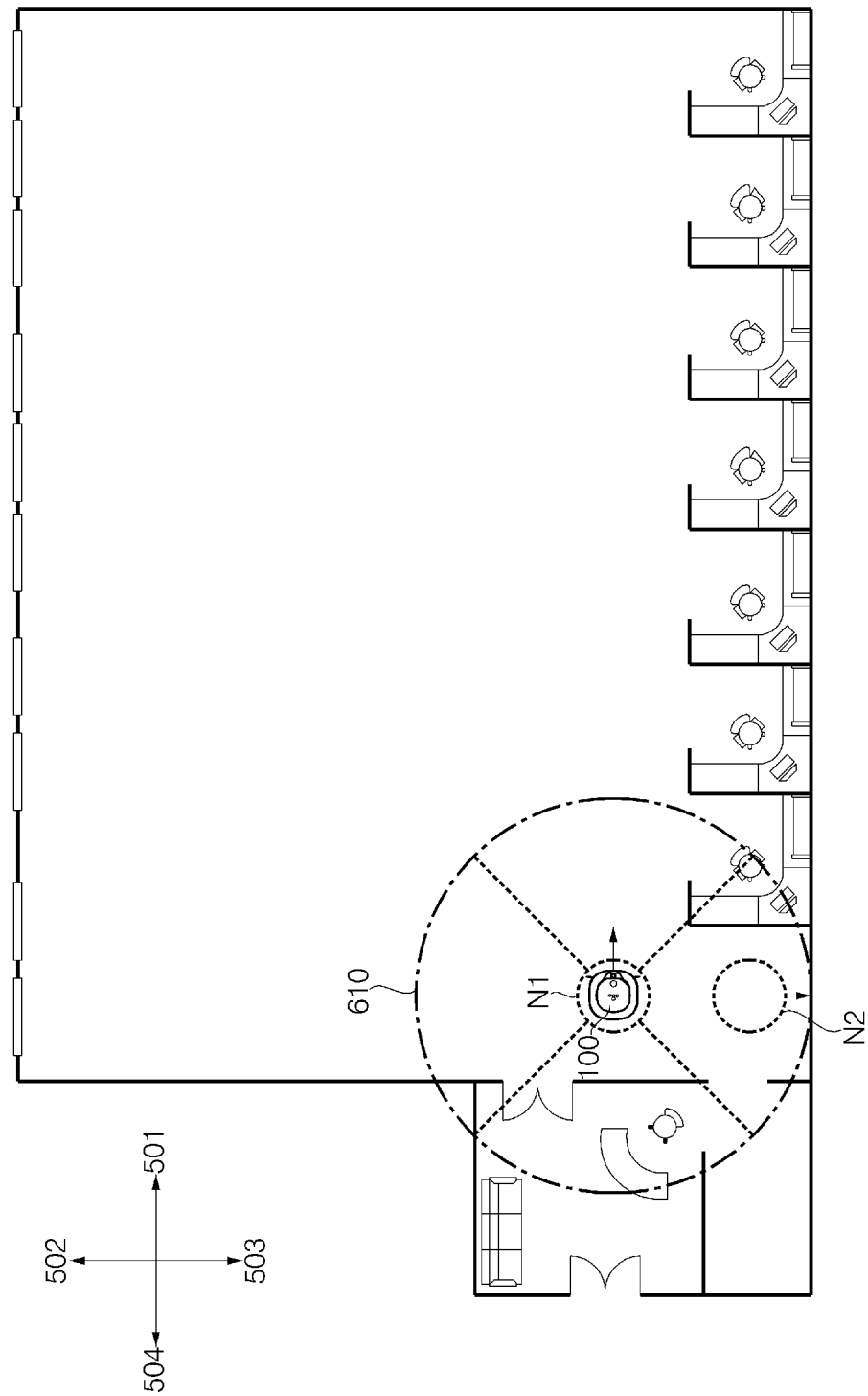
FIG. 6A to FIG. 6G are diagrams for explaining the operation of a moving robot, according to another embodiment of the present disclosure.

Referring to FIG. 6A, the moving robot 100 may set a plurality of movement directions when the map generation function is executed.

The moving robot 100 may determine whether an open movement direction exists among the plurality of movement directions 501 to 504, through a lidar sensor (e.g. the lidar sensor 175 of FIG. 4A).

At this time, dissimilarly to FIG. 5B, it can be seen that in an area corresponding to the first and second movement directions 501 and 502, the width of the movement passage based on the edge is not calculated.

That is, the moving robot 100 may determine the first and second movement directions 501 and 502 as an open movement direction, and determine that no obstacle exists within a certain distance 610 with respect to the first and second movement directions 501 and 502.

The moving robot 100 may determine one of the opened first and second movement directions 501 and 502 as the driving direction. At this time, since there is no obstacle within a certain distance 610 with respect to the first and second movement directions 501 and 502, the moving robot 100 may determine any one of the opened first and second movement directions 501 and 502 as the traveling direction.

Meanwhile, as shown in FIG. 5B, since an open movement direction exists among the plurality of movement directions 501 to 504, the moving robot 100 may generate a first node (N1), and may generate a second node N2 at a position spaced by a certain distance in the third movement direction 503 from the first node N1.

Figure 6B:
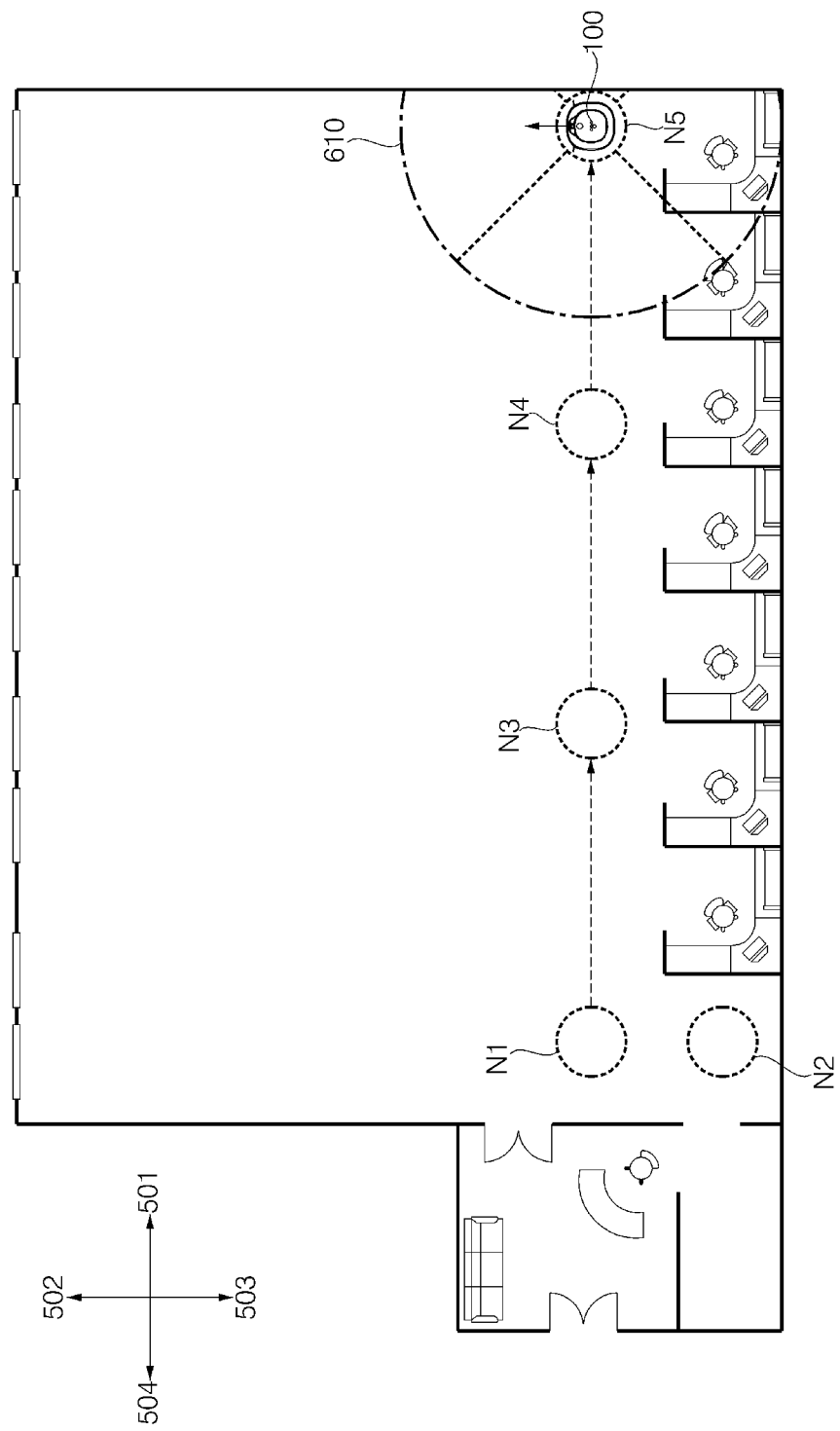

Referring to FIG. 6B, as shown in FIGS. 5C to 5F, the moving robot 100 may determine whether an open movement direction exists among the plurality of movement directions 501 to 504, while traveling in the traveling direction.

For example, the moving robot 100 may determine the first and second movement directions 501 and 502 as an open movement direction while traveling in the first movement direction 501 as the traveling direction. In addition, the moving robot 100 may determine that no obstacle exists within a certain distance 610 with respect to the first and second movement directions 501 and 502.

Meanwhile, if no obstacle exists within a certain distance 610 with respect to the first and second movement directions 501 and 502, the moving robot 100 continues to travel in the first movement direction 501 that is the traveling direction.

Meanwhile, the moving robot 100 may generate a new node according to a certain distance when traveling only in a traveling direction over a certain distance.

The moving robot 100 may generate a more accurate map by generating the third and fourth nodes N3 and N4 whenever moving a certain distance, while traveling in the first movement direction 501 that is the traveling direction.

Meanwhile, in the same manner as the method of generating the fifth node N5 in FIGS. 5E and 5F, while traveling according to the traveling direction, the moving robot 100 may confirm that an obstacle (e.g. a wall surface) of a type that allows the moving robot 100 not to travel exists within a certain distance 610 with respect to the first movement direction 501 that is the traveling direction.

Meanwhile, while approaching the obstacle, the moving robot 100 may generate a fifth node N5, if it is confirmed that the first movement direction 501, which is the traveling direction, is not opened among the plurality of movement directions 501 to 504, and only the second movement direction 502 is open.

Meanwhile, data for the first node N1 to the fifth node N5 may be set as shown in Table 9 below.

TABLE 9

| Node | X coordinate (cm) | Y coordinate (cm) | First movement direction (501) | Second movement direction (502) | Third movement direction (503) | Fourth movement direction (504) |
|---|---|---|---|---|---|---|
| N1 | 0 | 0 | 3 | −2(open) | 2 | −1 |
| N2 | 0 | −200 | −1 | 1 | −1 | −1 |
| N3 | 400 | 0 | 4 | −2(open) | −1 | 1 |
| N4 | 800 | 0 | 5 | −2(open) | −1 | 3 |
| N5 | 1250 | 0 | −1 | −2(open) | −1 | 4 |

The moving robot 100 may set the second movement direction 502 which is the open movement direction as the traveling direction, and may move in the second movement direction 502 that is the traveling direction.

Figure 6C:
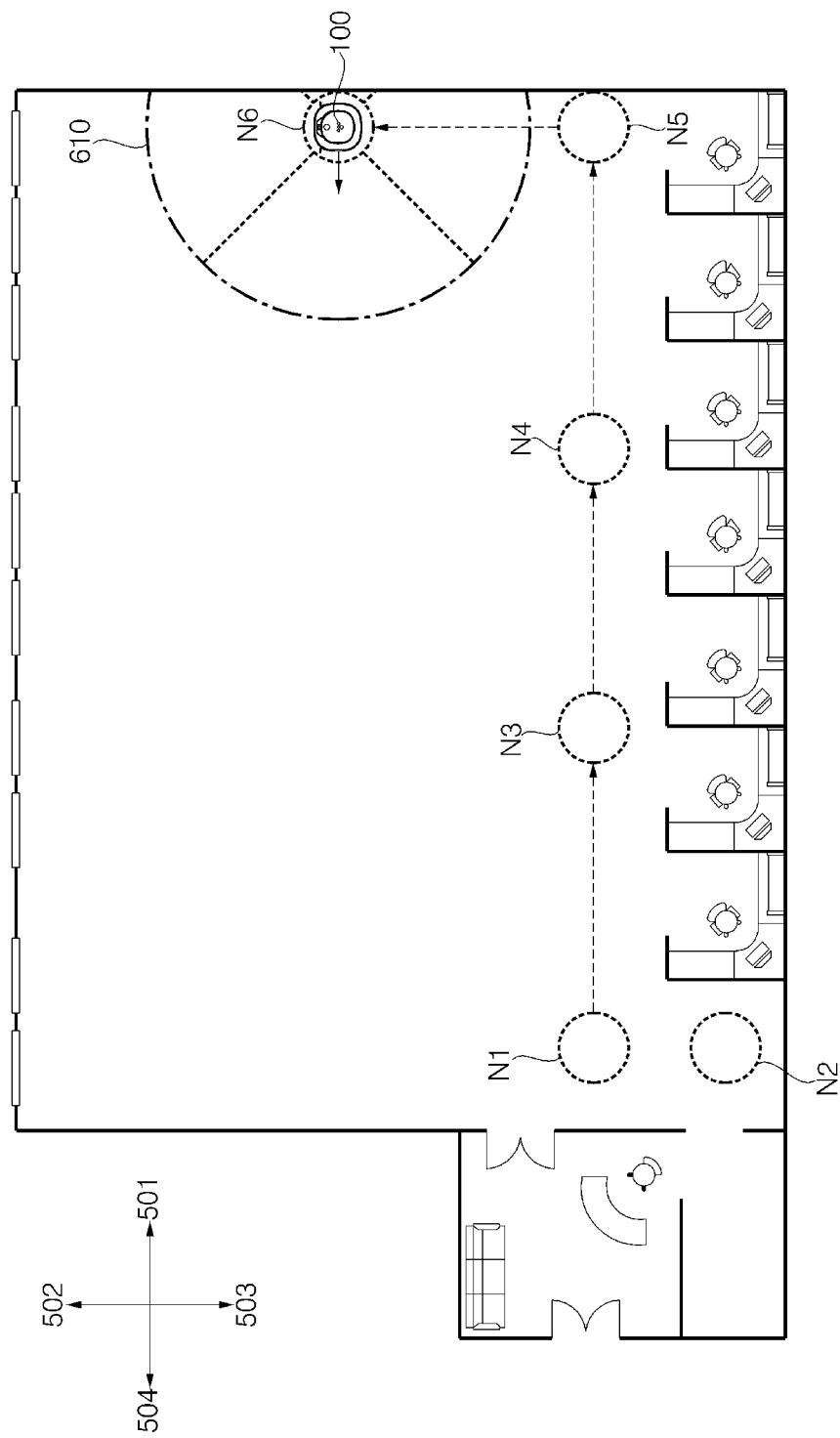

Referring to FIG. 6C, the moving robot 100 may determine the second and fourth movement directions 502 and 504 as an open movement direction, while traveling in the second movement direction 502 that is the traveling direction. In addition, the moving robot 100 may determine that no obstacle exists within a certain distance 610 with respect to the first to third movement directions 501 to 503.

Meanwhile, if no obstacle exists within a certain distance 610 with respect to the first to third movement directions 501 to 503, the moving robot 100 may continue to travel in the second movement direction 502 which is the traveling direction.

Meanwhile, the moving robot 100 may generate the sixth node N6 as it travels over a certain distance in the second movement direction 502 that is the traveling direction.

At this time, while the moving robot 100 travels over a certain distance after rotating in the second movement direction 502 which is the open movement direction in the fifth node N5, if it is determined that no obstacle exists within a certain distance 610 with respect to the second movement direction 502 that is the traveling direction and the fourth movement direction 504 that is the direction opposite to the previous traveling direction, after generating a new node, the moving robot 100 may change the traveling direction to the fourth moving direction 504 that is opposite direction to the previous traveling direction.

That is, when it is determined that the moving robot 100 travels in a large space having no obstacle, it is possible to effectively travel in a large space, by changing the traveling direction to the opposite direction of the previous traveling direction according to a certain condition.

Meanwhile, as shown in FIG. 6B, the moving robot 100 may travel according to the traveling direction, until the existence of an obstacle (e.g. a wall surface) of a type that allows the moving robot 100 not to move is checked within a certain distance 610 with respect to the traveling direction.

Figure 6D:
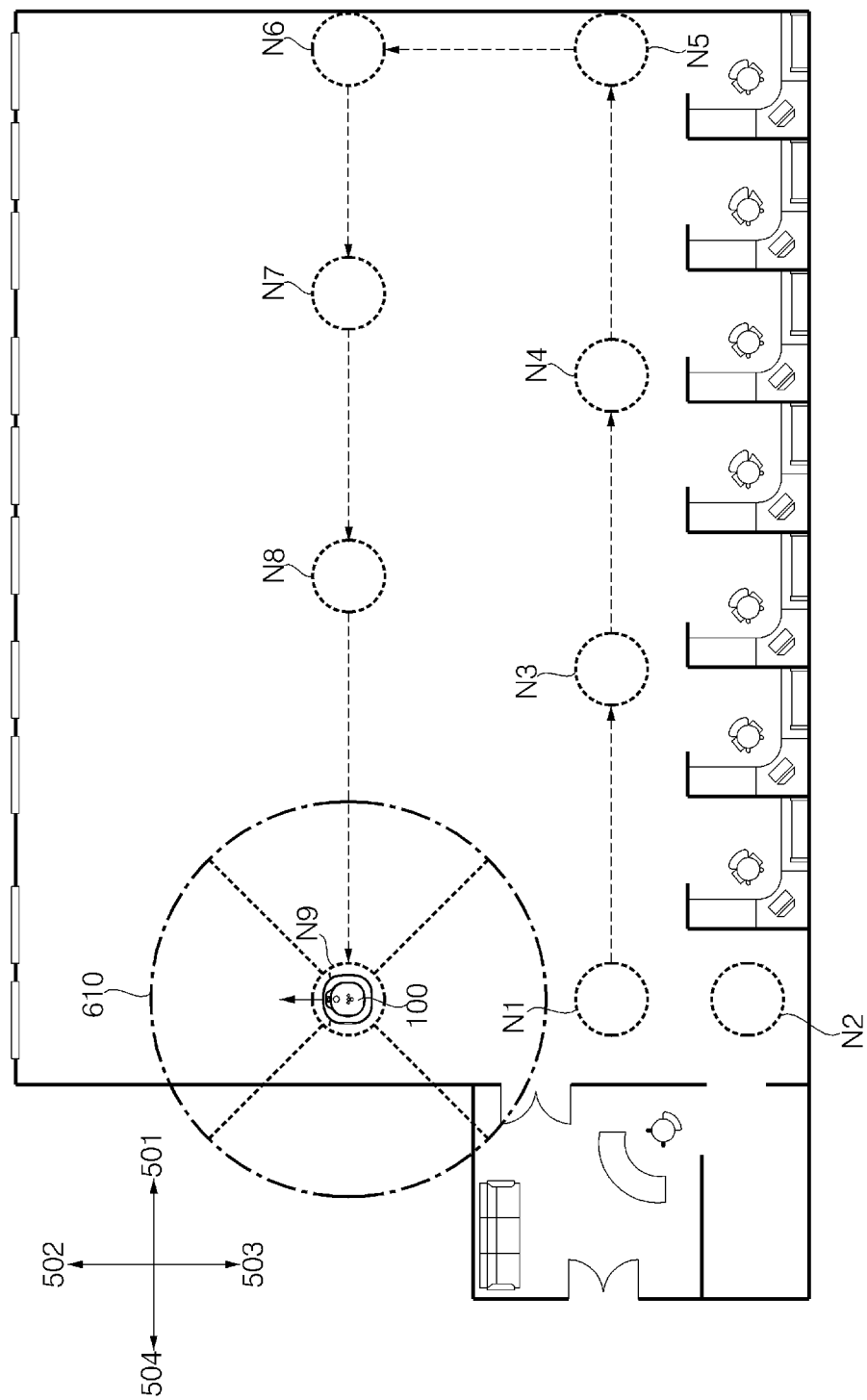

Referring to FIG. 6D, after changing the traveling direction to the opposite direction of the first movement direction 501 which is the previous traveling d direction, the moving robot 100 may travel in the fourth movement direction 504 which is the changed traveling direction.

Meanwhile, as shown in FIG. 6B, the moving robot 100 may determine the second to fourth movement directions 502 to 504 as the open movement direction, while traveling in the fourth movement direction 504 that is the traveling direction.

Meanwhile, the moving robot 100 may travel according to the fourth movement direction 504 that is the traveling direction, until the existence of an obstacle (e.g. a wall surface) of a type that allows the moving robot 100 not to move is checked within a certain distance 610 with respect to the fourth movement direction 504 that is the traveling direction.

Meanwhile, as shown in FIG. 6B, the moving robot 100 generates the seventh and eighth nodes N7 and N8 whenever moving a certain distance, while traveling in the fourth movement direction 504, thereby creating a more accurate map.

In addition, the moving robot 100 may confirm that an obstacle (e.g. a wall surface) of a type which allows the moving robot 100 not to travel exists within a certain distance 610 with respect to the fourth movement direction 504 that is the traveling direction. At this time, while approaching the obstacle, the moving robot 100 may generate a ninth node N9 when it is confirmed that among the plurality of movement directions 501 to 504, the fourth movement direction 504 that is the traveling direction is not opened, and only the second and third movement directions 502 and 503 are opened.

Meanwhile, data for the first node N1 to the ninth node N9 may be set as shown in Table 10 below.

TABLE 10

| Node | X coordinate (cm) | Y coordinate (cm) | First movement direction (501) | Second movement direction (502) | Third movement direction (503) | Fourth movement direction (504) |
|---|---|---|---|---|---|---|
| N1 | 0 | 0 | 3 | −2(open) | 2 | −1 |
| N2 | 0 | −200 | −1 | 1 | −1 | −1 |
| N3 | 400 | 0 | 4 | −2(open) | −1 | 1 |
| N4 | 800 | 0 | 5 | −2(open) | −1 | 3 |
| N5 | 1250 | 0 | −1 | 6 | −1 | 4 |
| N6 | 1250 | 400 | −1 | −2(open) | 5 | 7 |
| N7 | 850 | 400 | 6 | −2(open) | −2(open) | 8 |
| N8 | 450 | 400 | 7 | −2(open) | −2(open) | 9 |
| N9 | −50 | 400 | 8 | −2(open) | −2(open) | −1 |

The moving robot 100 may determine any one of the opened second and third movement directions 502 and 503 as the traveling direction. At this time, the moving robot 100 may determine the second movement direction 502 that is a clockwise direction with respect to the current traveling direction, in consideration of being rotated counterclockwise for traveling in a large space in FIG. 6C.

Figure 6E:
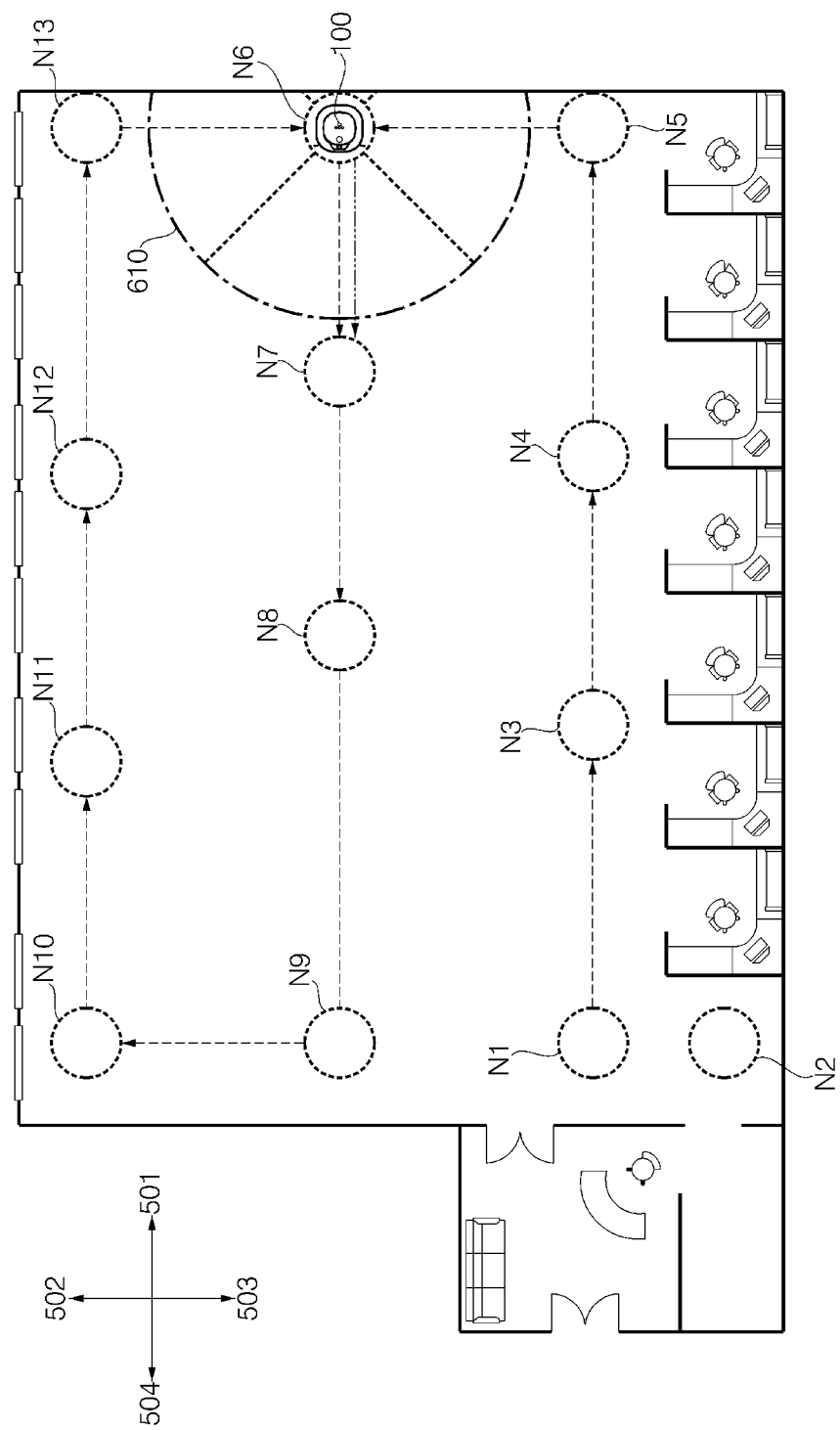

Referring to FIG. 6E, as shown in FIGS. 6B to 6D, while the moving robot 100 travels according to the traveling direction, tenth to thirteenth nodes N10 to N13 may be generated.

Meanwhile, it may be confirmed that the moving robot 100 is returned to the sixth node N6, while traveling in the third movement direction 503 from the thirteenth node N13.

The moving robot 100 may confirm that no open movement direction exists in a position corresponding to the sixth node N6. At this time, since the sixth node N6 is previously set in a corresponding position, the moving robot 100 does not generate a new node, and may determine whether there exists a node that needs to be updated among the nodes, based on the data for node.

Meanwhile, data for the first node N1 to the thirteenth node N13 may be set as shown in Table 11 below.

be updated, and may determine any one of the second and third movement directions that is the open movement direction in the seventh node N7 as the traveling direction.

Figure 6F:
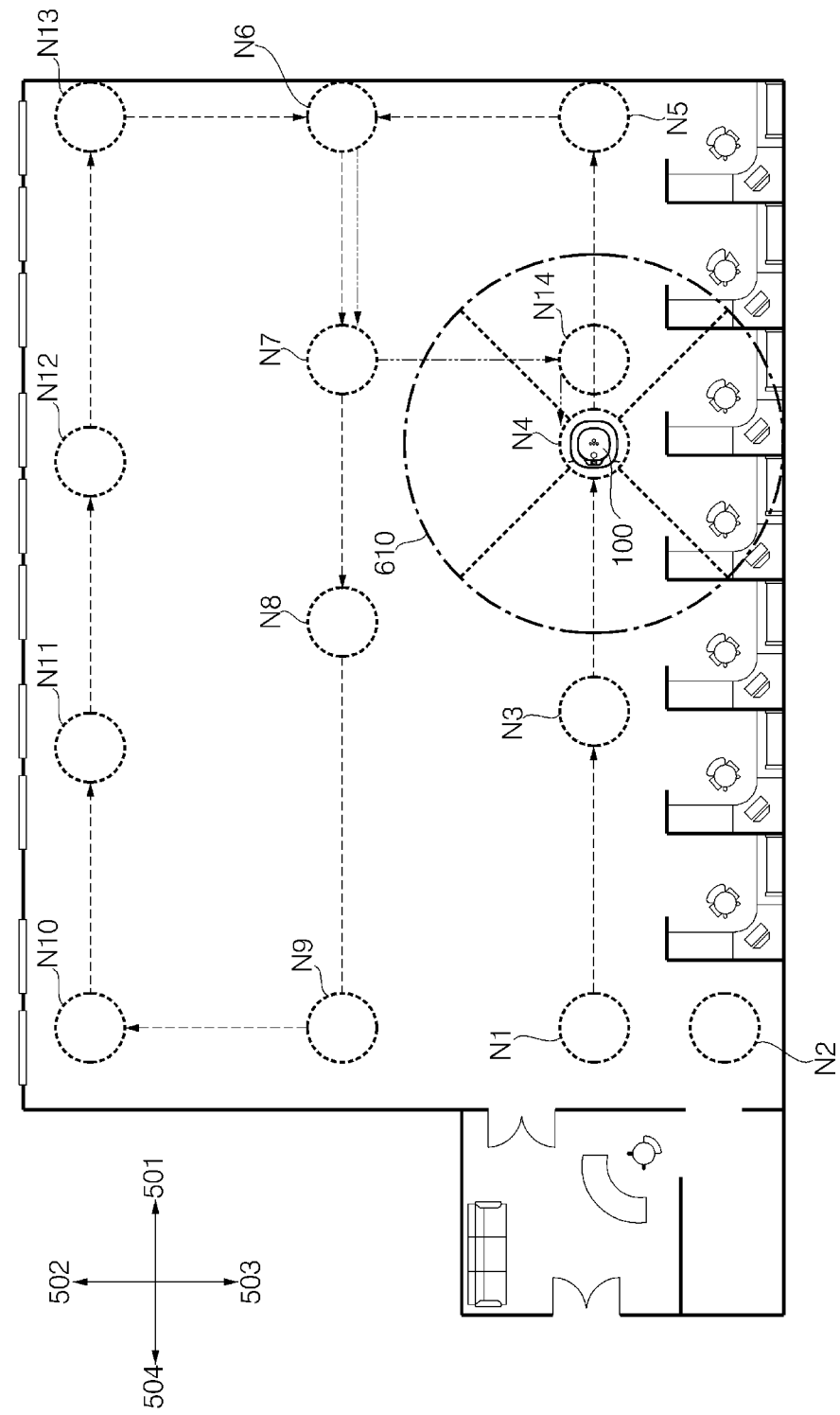

Referring to FIG. 6F, the third movement direction 503 may be determined as a travel direction in the seventh node N7, and the moving robot 100 may travel in the third movement direction 503 that is the travel direction.

While the moving robot 100 moves in the third movement direction 503 that is the traveling direction, with respect to the third movement direction 503 that is the traveling direction, it can be confirmed that an obstacle (e.g. a wall, a chair) of a type that allows the moving robot 100 not to travel exists within a certain distance 610.

Meanwhile, while approaching the obstacle, the moving robot 100 may generate a fourteenth node N14, when it is confirmed that the third movement direction 503 that is the traveling direction, among the plurality of movement directions 501 to 504, is not opened, and only the first and fourth movement directions 501 and 504 are opened.

TABLE 11

| Node | X coordinate (cm) | Y coordinate (cm) | First movement direction (501) | Second movement direction (502) | Third movement direction (503) | Fourth movement direction (504) |
|---|---|---|---|---|---|---|
| N1  | 0    | 0    | 3  | −2(open) | 2        | −1 |
| N2  | 0    | −200 | −1 | 1        | −1       | −1 |
| N3  | 400  | 0    | 4  | −2(open) | −1       | 1  |
| N4  | 800  | 0    | 5  | −2(open) | −1       | 3  |
| N5  | 1250 | 0    | −1 | 6        | −1       | 4  |
| N6  | 1250 | 400  | −1 | 13       | 5        | 7  |
| N7  | 850  | 400  | 6  | −2(open) | −2(open) | 8  |
| N8  | 450  | 400  | 7  | −2(open) | −2(open) | 9  |
| N9  | −50  | 400  | 8  | 10       | −2(open) | −1 |
| N10 | −50  | 900  | 11 | −1       | 9        | −1 |
| N11 | 350  | 900  | 12 | −1       | −2(open) | 10 |
| N12 | 750  | 900  | 13 | −1       | −2(open) | 11 |
| N13 | 1250 | 900  | −1 | −1       | 6        | 12 |

The moving robot 100 may move to the seventh node N7 positioned in the shortest distance among nodes that need to Meanwhile, data for the first node N1 to the fourteenth node N14 may be set as shown in Table 12 below.

TABLE 12

| Node | X coordinate (cm) | Y coordinate (cm) | First movement direction (501) | Second movement direction (502) | Third movement direction (503) | Fourth movement direction (504) |
|---|---|---|---|---|---|---|
| N1  | 0    | 0    | 3        | −2(open) | 2        | −1       |
| N2  | 0    | −200 | −1       | 1        | −1       | −1       |
| N3  | 400  | 0    | 4        | −2(open) | −1       | 1        |
| N4  | 800  | 0    | 5        | −2(open) | −1       | 3        |
| N5  | 1250 | 0    | −1       | 6        | −1       | 4        |
| N6  | 1250 | 400  | −1       | 13       | 5        | 7        |
| N7  | 850  | 400  | 6        | −2(open) | 14       | 8        |
| N8  | 450  | 400  | 7        | −2(open) | −2(open) | 9        |
| N9  | −20  | 400  | 8        | 10       | −2(open) | −1       |
| N10 | −20  | 900  | 11       | −1       | 9        | −1       |
| N11 | 350  | 900  | 12       | −1       | −2(open) | 10       |
| N12 | 750  | 900  | 13       | −1       | −2(open) | 11       |
| N13 | 1250 | 900  | −1       | −1       | 6        | 12       |
| N14 | 850  | −30  | −2(open) | 7        | −1       | −2(open) |

Meanwhile, with respect to each node, the moving robot 100 may determine nodes positioned within a certain reference radius (e.g. 70 cm) as the same node. Referring to Table 12, in the case of the fourteenth node (N14), it can be confirmed that it is positioned within a certain reference radius (e.g. 70 cm) from the fourth node (N4).

Figure 6G:
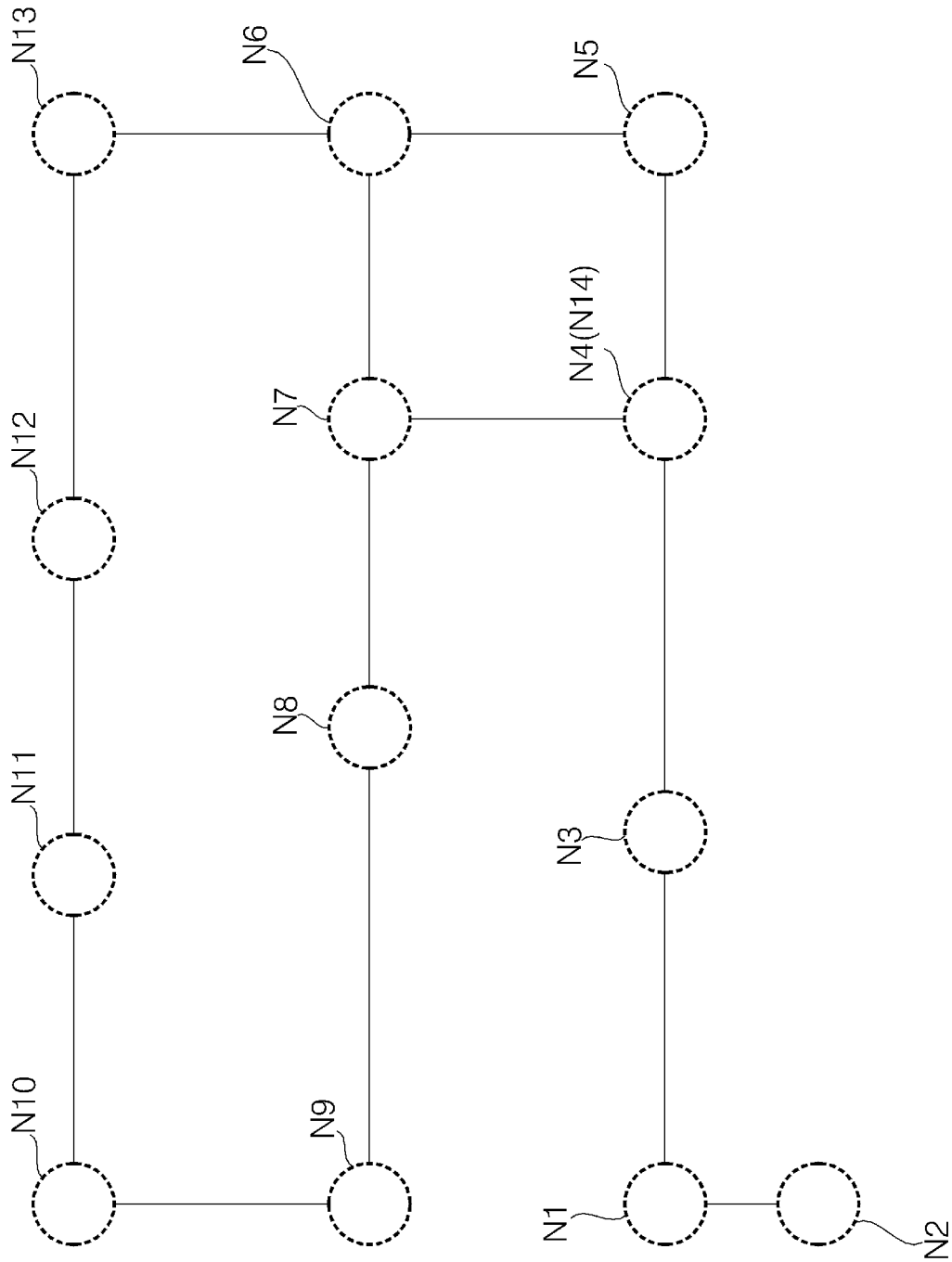

Referring to FIG. 6G, the moving robot 100 may determine the fourth node N4 and the fourteenth node N14 as the same node. Meanwhile, when it is determined that the plurality of nodes are the same node, the moving robot 100 may delete data for the remaining nodes excluding the first generated node among the plurality of nodes.

Meanwhile, data for a node in FIG. 6G may be set as shown in Table 13 below.

TABLE 13

| Node | X coordinate (cm) | Y coordinate (cm) | First movement direction (501) | Second movement direction (502) | Third movement direction (503) | Fourth movement direction (504) |
|---|---|---|---|---|---|---|
| N1 | 0 | 0 | 3 | −2(open) | 2 | −1 |
| N2 | 0 | −200 | −1 | 1 | −1 | −1 |
| N3 | 400 | 0 | 4 | −2(open) | −1 | 1 |
| N4 | 800 | 0 | 5 | 7 | −1 | 3 |
| N5 | 1250 | 0 | −1 | 6 | −1 | 4 |
| N6 | 1250 | 400 | −1 | 13 | 5 | 7 |
| N7 | 850 | 400 | 6 | −2(open) | 4 | 8 |
| N8 | 450 | 400 | 7 | −2(open) | −2(open) | 9 |
| N9 | −20 | 400 | 8 | 10 | −2(open) | −1 |
| N10 | −20 | 900 | 11 | −1 | 9 | −1 |
| N11 | 350 | 900 | 12 | −1 | −2(open) | 10 |
| N12 | 750 | 900 | 13 | −1 | −2(open) | 11 |
| N13 | 1250 | 900 | −1 | −1 | 6 | 12 |

FIG. 7 is a flowchart illustrating a control method of a moving robot, according to an embodiment of the present disclosure.

Referring to FIG. 7, in operation S701, the moving robot 100 may determine whether an open movement direction exists among the plurality of movement directions 501 to 504.

For example, with respect to each of a plurality of preset movement directions 501 to 504, the moving robot 100 may determine whether there is no obstacle (e.g. a wall surface) of the type that allows the moving robot 100 not to travel within a certain distance (e.g. 3 m) to the moving robot 100, the width of the movement passage is greater than or equal to a certain reference width that allows the moving robot 100 to travel, and the movement direction is a direction in which the moving robot 100 has not previously traveled.

The moving robot 100 may generate a node according to a preset condition, when an open movement direction exists among the plurality of movement directions 501 to 504, in operation S702.

For example, when the current travel direction of the moving robot 100 is not included in the open movement direction, or when a plurality of movement directions including the current travel direction of the moving robot 100 is included in the open movement direction, the moving robot 100 may generate a node.

Meanwhile, for example, when only the movement direction set as the current travel direction of the moving robot 100 is open, the moving robot 100 may move straight according to the set travel direction without generating a node.

Meanwhile, for example, the moving robot 100 may not generate a node when a node corresponding to the current position exists.

Meanwhile, the data for the node may include a data value on whether the plurality of movement directions 501 to 504 are open in a position corresponding to the node.

The moving robot 100 may determine any one of the open movement directions as the travel direction of the moving robot 100, in operation S703.

For example, the moving robot 100 may compare the widths of the movement passages for each of the open movement directions, and determine the movement direction of the movement passage having the widest width as the travel direction.

Alternatively, for example, the moving robot 100 may maintain a movement direction set as the current travel direction, among the open movement directions, as the travel direction.

The moving robot 100 may move in the movement direction determined as the travel direction, in operation S704.

At this time, the moving robot 100 may travel along the center of the movement passage while traveling in the movement passage of the travel direction.

For example, while traveling in the movement passage of the travel direction, the moving robot 100 may detect a center point of the movement passage based on an edge that is a reference for calculating the width of the movement passage, and may travel along the center point.

Meanwhile, while traveling in the movement passage in the travel direction, the moving robot 100 may continuously determine whether the open movement direction exists among the plurality of movement directions 501 to 504.

Meanwhile, in operation S705, the moving robot 100 may determine whether a node that needs to be updated exists among the nodes, when no open movement direction exists among the plurality of movement directions 501 to 504.

For example, the moving robot 100 may check the data value for each node, and when a node including the data value indicating the open movement direction exists among data values for the plurality of movement directions 501 to 504, may determine a corresponding node as a node that needs to be updated.

The moving robot 100 may move to any one of the nodes that need to be updated, when a node that needs to be updated exists, in operation S706.

For example, the moving robot 100 may move to a node positioned in the shortest distance from the current position of the moving robot 100, among nodes that need to be updated.

Meanwhile, in operation S707, if there is no node that needs to be updated, the moving robot 100 may store the generated global topological map in the storage unit 305 to complete the map generation.

Figure 8A:
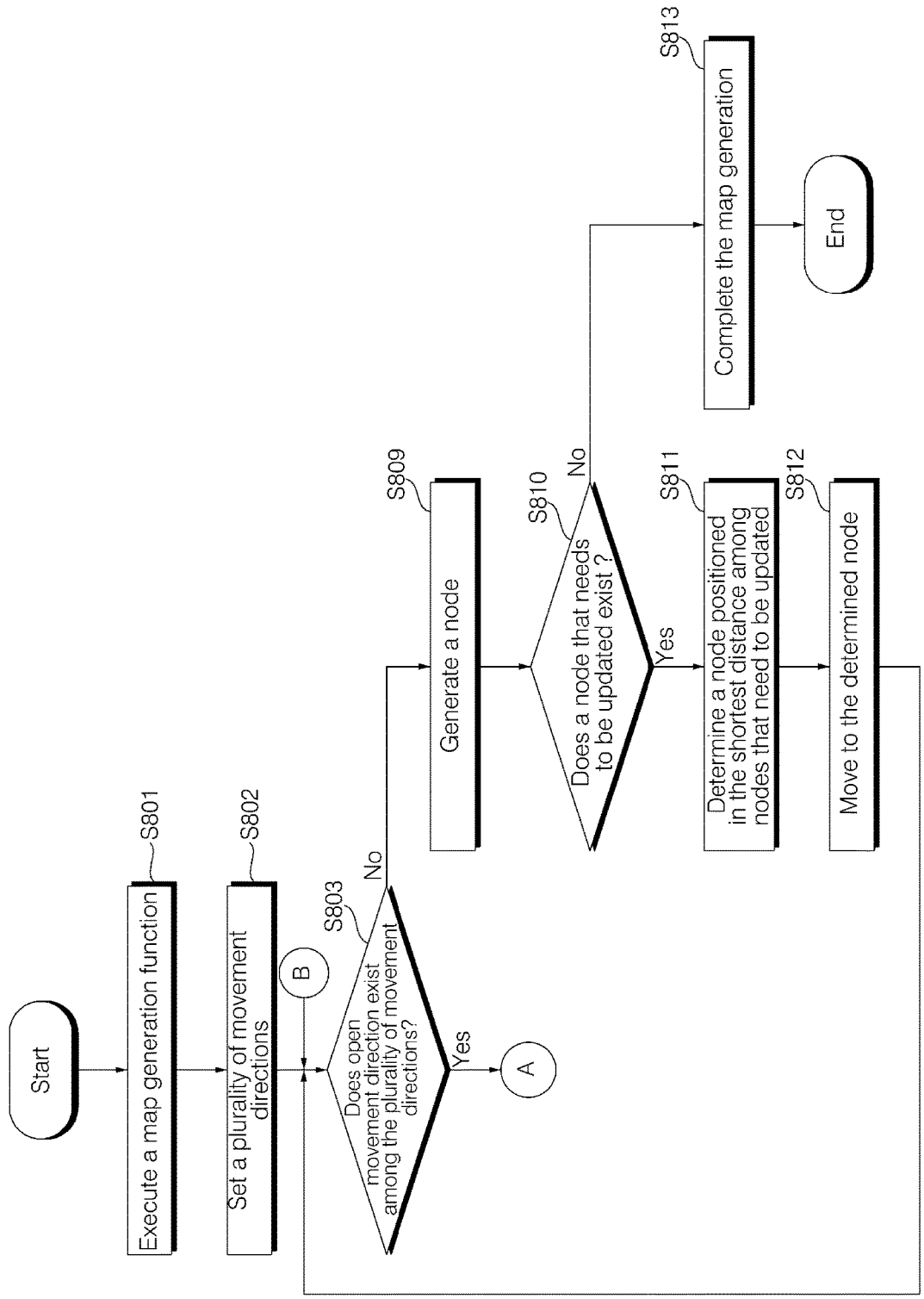
FIG. 8A and FIG. 8B are diagrams illustrating a flowchart of a control method of a moving robot, according to an embodiment of the present disclosure.
Figure 8B:
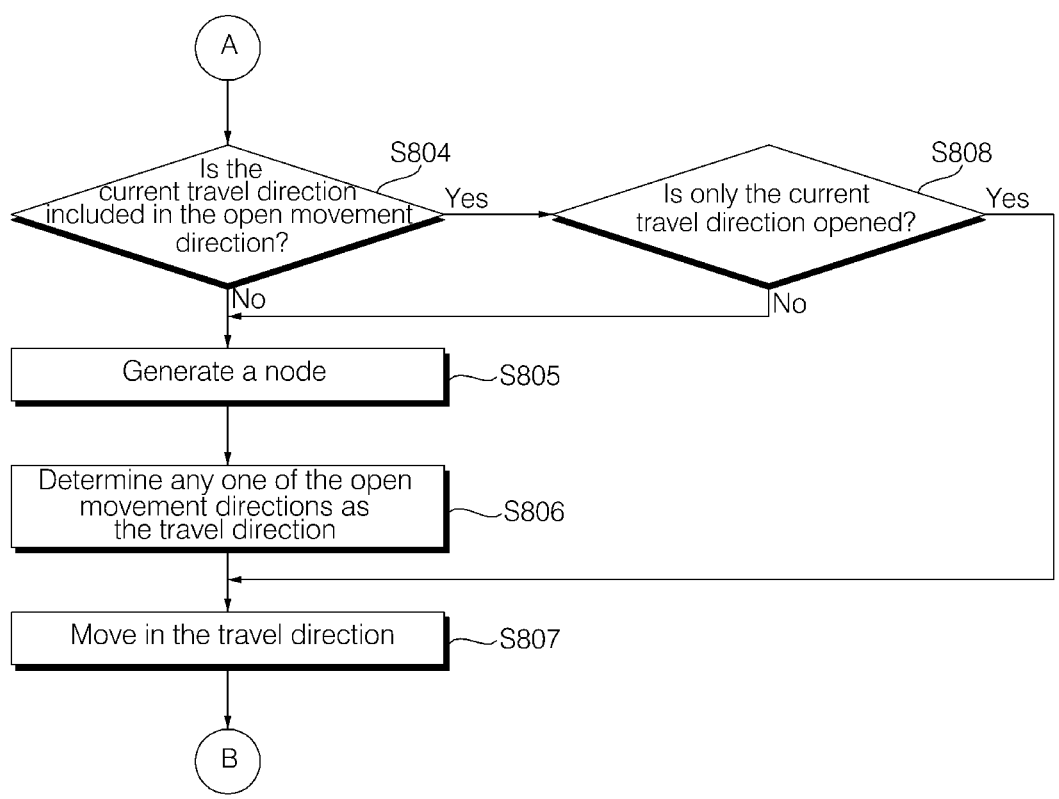

FIG. 8A and FIG. 8B are diagrams illustrating a flowchart of a control method of a moving robot, according to an embodiment of the present disclosure.

Referring to FIG. 8A, the moving robot 100 may execute a map generation function, in operation S801. For example, the moving robot 100 may execute the map generation function, when the power is turned on or when a command for executing the map generation function is input from a user.

The moving robot 100 may set a plurality of movement directions 501 to 504, in operation S802.

For example, if the map generation function is executed, at the time when the map generation function is executed, the moving robot 100 may set the direction in which the front surface of the moving robot 100 faces as a first movement direction 501, set the direction in which the left side surface of the moving robot 100 faces as the second movement direction 502, set the direction in which the right side surface of the moving robot 100 faces as the third movement direction 503, and set the direction in which the rear surface of the moving robot 100, which is the direction opposite to the first direction, faces as the fourth movement direction 504.

The moving robot 100 may determine whether an open movement direction exists among the plurality of movement directions 501 to 504, in operation S803.

For example, with respect to each of the preset plurality of movement directions 501 to 504, the moving robot 100 may determine whether there is no obstacle (e.g. a wall surface) of the type that allows the moving robot 100 not to travel within a certain distance (e.g. 3 m) to the moving robot 100, the width of the movement passage is greater than or equal to a certain reference width that allows the moving robot 100 to travel, and the movement direction is a direction in which the moving robot 100 has not previously traveled.

Referring to FIG. 8B, when an open movement direction exists, the moving robot 100 may determine whether the current travel direction of the moving robot 100 is included in the open movement direction, in operation S804.

At this time, when the map generation function is executed, the travel direction may not be set, and it may be determined that the current travel direction of the moving robot 100 is not included in the open movement direction.

In operation S805, if the current traveling direction of the moving robot 100 is not included in the open movement direction, the moving robot 100 may generate a node for the current position of the moving robot 100.

In operation S806, the moving robot 100 may determine any one of the open movement directions as the travel direction.

For example, the moving robot 100 may compare the widths of the movement passages for each of the open movement directions, and determine the movement direction of the movement passage having the widest width as the travel direction.

The moving robot 100 may move in the movement direction determined as the travel direction, in operation S807.

At this time, while traveling in the movement passage of the travel direction, the moving robot 100 may travel along the center of the movement passage.

For example, while traveling in the movement passage of the travel direction, the moving robot 100 may detect a center point of the movement passage based on an edge that is a reference for calculating the width of the movement passage, and may travel along the center point.

Meanwhile, while traveling in the movement passage of the travel direction, the moving robot 100 may continuously determine whether an open movement direction exists among the plurality of movement directions 501 to 504.

Meanwhile, in operation S808, if the current travel direction of the moving robot 100 is included in the open movement direction, the moving robot 100 may check whether only the current travel direction is the open movement direction.

At this time, if a plurality of open movement directions including the current travel direction exist, the moving robot 100 branches to operation S805, and may generate a node for the current position of the moving robot 100.

Meanwhile, if only the current travel direction among the plurality of movement directions 501 to 504 is an open movement direction, the moving robot 100 branches to operation S807, and may continue to move in the movement direction determined as the travel direction.

Meanwhile, referring to FIG. 8A again, if an open movement direction does not exist, the moving robot 100 may generate a node, in operation S809.

At this time, if a node is previously set in a corresponding position, the moving robot 100 may not generate a new node.

Meanwhile, in operation S810, the moving robot 100 may determine whether a node that needs to be updated exists among the nodes.

For example, the moving robot 100 checks data values for each node, and when a node including the data value indicating an open movement direction exists among data values for the plurality of movement directions 501 to 504, may determine that a corresponding as a node that needs to be updated.

The moving robot 100 may determine any one of the nodes that need to be updated, when a node that needs to be updated exists, in operation S811.

For example, the moving robot 100 may determine a node positioned in the shortest distance from the current position of the moving robot 100, among nodes that need to be updated.

The moving robot 100 may move to the node determined in operation S811, in operation S812.

For example, the moving robot 100 may move to a node positioned in the shortest distance from the current position of the moving robot 100, among nodes that need to be updated.

Meanwhile, if there is no node that needs to be updated, the moving robot 100 may store the generated global topological map in the storage unit 305 to complete the map generation, in operation S813.

As described above, according to various embodiments of the present disclosure, a node can be generated in real time while the moving robot 100 is moving, and a connection relationship between nodes can be accurately set.

In addition, according to various embodiments of the present disclosure, while generating the topological map, the moving robot 100 travels along the center of the moving passage to move while minimizing the action to avoid obstacles, thereby generating a topological map that provides a more stable movement path.

In addition, according to various embodiments of the present disclosure, the moving robot 100 may accurately set information related with each node such as data value for the plurality of movement directions 501 to 504, thereby generating a topological map that provides a more accurate travel path.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The present disclosure has been made in view of the above problems, and provides a moving robot for accurately setting a connection relationship between nodes, when generating a topological map, by generating a node in real time while the moving robot is moving, and a control method thereof.

The present disclosure further provides a moving robot capable of moving while minimizing an operation of avoiding an obstacle, when generating a topological map, and a control method thereof.

The present disclosure further provides a moving robot capable of more accurately setting information on each node, as well as a connection relationship between nodes, when generating a topological map, and a control method thereof.

In order to achieve the above object, the moving robot according to an embodiment of the present disclosure may determine whether it is open with respect to each of a plurality of preset movement directions, and may generate a new node according to the determination result to generate a map, based on external terrain information obtained through a lidar sensor.

In order to achieve the above object, the moving robot according to an embodiment of the present disclosure may include a traveling unit configured to move a main body; a lidar sensor configured to acquire terrain information outside the main body; a memory configured to store node data for at least one node; and a controller, and the controller determines whether at least one open movement direction exists among a plurality of preset movement directions, based on sensing data of the lidar sensor and the node data, generates a new node in the node data according to a preset condition, when at least one open movement direction exists, determines any one of the open movement directions as a traveling direction in which the main body moves, determines whether at least one node that needs to be updated exists among the at least one node, based on the node data when the open movement direction does not exist, controls the traveling unit so that the moving robot moves to any one of the nodes that need to be updated, when the node that needs to be updated exists, and completes generation of a map including the at least one node, based on the node data, when the node that needs to be updated does not exist.

Meanwhile, in order to achieve the above object, the controller of the moving robot according to an embodiment of the present disclosure determines whether the moving robot is able to travel, with respect to each of the plurality of movement directions, determines whether it is a movement direction in which the moving robot has previously traveled, with respect to each of the plurality of movement directions, and determines, among the plurality of movement directions, the movement direction in which the moving robot is able to travel and the moving robot has not previously traveled, as the open movement direction.

Meanwhile, the node data includes a coordinate value of node and a data value for each of the plurality of movement directions, with respect to each of the at least one node.

Meanwhile, the data value for each of the plurality of movement directions is set to any one of a first data value indicating the open movement direction, a second data value indicating a movement direction in which the moving robot is unable to travel, and a third data value indicating other node.

Meanwhile, the controller determines whether the movement direction determined as the travel direction corresponds to the open movement direction when at least one open movement direction exists, and generates the new node when the movement direction determined as the travel direction does not correspond to the open movement direction.

Meanwhile, the controller determines whether only the movement direction determined as the travel direction, among the plurality of movement directions, corresponds to the open movement direction, when the movement direction determined as the travel direction corresponds to the open movement direction, does not generate the new node, and controls the traveling unit so that the moving robot moves in the travel direction, when only the movement direction determined as the travel direction corresponds to the open movement direction, and generates the new node, when a plurality of movement directions including the movement direction determined as the travel direction correspond to the open movement direction.

Meanwhile, the controller updates data value, for the plurality of movement directions, of each of the at least one node included in the node data, when generating the new node.

Meanwhile, the controller determines, with respect to at least one of data values for each of the plurality of movement directions, a node set as the first data value indicating the open movement direction, as a node that needs to be updated.

Meanwhile, the controller determines a node positioned in a shortest distance from a current position of the moving robot, among nodes that need to be updated, based on the node data, and controls the traveling unit so that the moving robot moves to the node positioned in the shortest distance.

Meanwhile, the moving robot according to an embodiment of the present disclosure may further includes an image acquisition unit having at least one camera for acquiring an image outside the main body, wherein the controller extracts feature from the image acquired through the image acquisition unit, maps the extracted feature to the map, and determines a position of the moving robot based on the feature mapped to the map.

In order to achieve the above object, a method of controlling a moving robot according to an embodiment of the present disclosure may include determining whether at least one open movement direction exists among a plurality of preset movement directions, based on sensing data of a lidar sensor acquiring outside terrain information and node data for at least one node; generating a new node in the node data according to a preset condition, when at least one open movement direction exists; determining any one of the open movement directions as a traveling direction in which a main body of the moving robot moves; determining whether at least one node that needs to be updated exists among the at least one node, based on the node data, when the open movement direction does not exist; moving to any one of the nodes that need to be updated, when the node that needs to be updated exists; and completing generation of a map including the at least one node, based on the node data, when the node that needs to be updated does not exist.

Meanwhile, determining whether at least one open movement direction exists includes: determining whether the moving robot is able to travel, with respect to each of the plurality of movement directions; and determining whether it is a movement direction in which the moving robot has previously traveled, with respect to each of the plurality of movement directions; and determining, among the plurality of movement directions, the movement direction in which the moving robot is able to travel and the moving robot has not previously traveled, as the open movement direction.

Meanwhile, the node data includes a coordinate value of node and a data value for each of the plurality of movement directions, with respect to each of the at least one node.

Meanwhile, the data value for each of the plurality of movement directions is set to any one of a first data value indicating the open movement direction, a second data value indicating a movement direction in which the moving robot is unable to travel, and a third data value indicating other node.

Meanwhile, generating a new node includes: determining whether the movement direction determined as the travel direction corresponds to the open movement direction when at least one open movement direction exists; and generating the new node when the movement direction determined as the travel direction does not correspond to the open movement direction.

Meanwhile, generating the new node further includes determining whether only the movement direction determined as the travel direction, among the plurality of movement directions, corresponds to the open movement direction, when the movement direction determined as the travel direction corresponds to the open movement direction; moving in the travel direction without generating the new node, when only the movement direction determined as the travel direction corresponds to the open movement direction; and generating the new node, when a plurality of movement directions including the movement direction determined as the travel direction correspond to the open movement direction.

Meanwhile, generating the new node further includes updating data value, for the plurality of movement directions, of each of the at least one node included in the node data.

Meanwhile, determining whether at least one node that needs to be updated exists includes determining, with respect to at least one of data values for each of the plurality of movement directions, a node set as the first data value indicating the open movement direction, as a node that needs to be updated.

Meanwhile, moving to any one of the nodes that need to be updated includes: determining a node positioned in a shortest distance from a current position of the moving robot, among nodes that need to be updated, based on the node data; and moving to the node positioned in the shortest distance.

In order to achieve the above object, a method of controlling a moving robot according to an embodiment of the present disclosure may further include extracting feature from an image acquired through an image acquisition unit having at least one camera for acquiring an outside image; mapping the extracted feature to the map; and determining a position of the moving robot based on the feature mapped to the map.

As described above, according to various embodiments of the present disclosure, a node can be generated in real time while the moving robot 100 is moving, so that a connection relationship between nodes can be accurately set.

In addition, according to various embodiments of the present disclosure, while generating the topological map, the moving robot travels along the center of the moving passage to move while minimizing the action to avoid obstacles, thereby generating a topological map that provides a more stable movement path.

In addition, according to various embodiments of the present disclosure, information related with each of nodes can be accurately set, thereby generating a topological map that provides a more accurate travel path.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving robot comprising:
   a driving wheel configured to move a main body of the moving robot;
   a lidar sensor configured to acquire sensing data regarding terrain outside of the main body;
   a memory configured to store node data for at least one node; and
   a controller configured to:
   determine whether at least one open movement direction is present among a plurality of movement directions from the main body, based on the sensing data of the lidar sensor and the node data,
   generate a new node corresponding to a current position of the moving robot in the node data when the at least one open movement direction is present,
   select one of the at least one open movement direction as a travel direction in which the driving wheel moves the main body,
   determine whether one or more nodes to be updated are present among the at least one node, based on the node data, when the at least one open movement direction is not present,
   control, when the one or more nodes to be updated are present, the driving wheel so that the main body moves to one of the nodes to be updated, and
   complete generation of a map including the at least one node, based on the node data, when the one or more nodes to be updated are not present,
   wherein the open movement direction is a direction in which the moving robot is able to travel and the moving robot has not previously traveled, and
   wherein the node data includes, with respect to each of the at least one node, a coordinate and a data value for each of the plurality of movement directions,
   wherein the data value for each of the plurality of movement directions is set to one of a first data value indicating the open movement direction, a second data value indicating that the moving robot is unable to travel from the node, or a third data value indicating another node among the at least one node.

2. The moving robot of claim 1, wherein the controller is configured to:
   determine a first subset of the plurality of movement directions in which the moving robot is able to travel,
   determine a second subset of the plurality of movement directions in which the moving robot has not previously traveled, and
   determine at least one of the plurality of movement directions included in the first subset and the second subset as the at least one open movement direction.

3. The moving robot of claim 1, wherein the controller is configured to:
   when the at least one open movement direction is present, determine whether a movement direction preset to the travel direction corresponds to the open movement direction, and
   generate the new node when the movement direction preset to the travel direction does not correspond to the one open movement direction.

4. The moving robot of claim 3, wherein the controller is configured to:
   determine whether only the movement direction preset to the travel direction, among the plurality of movement directions, corresponds to the open movement direction,
   control the driving wheel so that the moving robot moves in the movement direction preset to the travel direction without generating the new node, when only the movement direction preset to the travel direction corresponds to the open movement direction, and
   generate the new node, when two or more of the movement directions including the movement direction preset to the travel direction correspond to the open movement direction.

5. The moving robot of claim 4, wherein the controller is configured to update the data values for the plurality of movement directions of each of the at least one node included in the node data when generating the new node.

6. The moving robot of claim 5, wherein the controller is configured to determine, with respect to at least one of the data value for each of the plurality of movement directions, a node set as the first data value indicating the open movement direction among the at least one node, as a node to be updated.

7. The moving robot of claim 6, wherein, when the one or more nodes to be updated are present, the controller is configured to:
   determine a node positioned in a shortest distance from the current position of the moving robot among the one or more nodes to be updated, based on the node data, and control the driving wheel so that the moving robot moves to the node positioned in the shortest distance from the current position of the moving robot among the nodes to be updated.

8. The moving robot of claim 7, further comprising least one camera configured to acquire an image outside of the main body,
wherein the controller is configured to extract a feature from the image, map the extracted feature to the map, and determine a position of the moving robot based on the feature mapped to the map.

9. A method of controlling a moving robot, the method comprising:
determining whether at least one open movement direction is included among a plurality of movement directions with respect to a current position of the moving robot;
generating, when the at least one open movement direction is included among of the plurality of movement directions, a new node corresponding to the current position of the moving robot in node data stored in a memory of the moving robot and select one of the at least one open movement direction as a travel direction in which the moving robot travels;
determining whether at least one node is to be updated when none of the plurality of movement directions is the open movement direction with respect to the current position of the moving robot and control, when the at least one node is to be updated, the moving robot to travel to one of the at least one node to be updated; and
generating a map based on the node data when none of the at least one node is to be updated,
wherein the open movement direction is a direction in which the moving robot is able to travel and the moving robot has not previously traveled, and
wherein the node data includes, with respect to each of the at least one node, a coordinate and a data value for each of the plurality of movement directions,
wherein the data value for each of the plurality of movementdirections is set to one of a first data value indicating the open movement direction, a second data value that the moving robot is unable to travel from the node, or a third data value indicating another node among the at least one node.

10. The method of claim 9, wherein determining whether the at least one open movement direction is included among of the plurality of movement directions includes:
determining whether the moving robot is able to travel, with respect to each of the plurality of movement directions; and
determining whether the moving robot has previously traveled along of the plurality of movement directions from the current position; and determining, among the plurality of movement directions, at least one of the movement directions in which the moving robot is able to travel and along which the moving robot has not previously traveled, as the open movement direction.

11. The method of claim 9, wherein generating a new node includes:
when the at least one open movement direction is included among of the plurality of movement directions, determining whether a movement direction preset to the travel direction corresponds to the open movement direction; and
generating the new node when the movement direction preset to the travel direction does not correspond to the open movement direction.

12. The method of claim 11, wherein generating the new node further includes:
determining whether only the movement direction preset to the travel direction, among the plurality of movement directions, corresponds to the open movement direction;
moving in the movement direction preset to the travel direction without generating the new node when only the movement direction preset to the travel direction corresponds to the open movement direction; and
generating the new node when two or more of the movement directions, including the movement direction preset to the travel direction, correspond to the open movement direction.

13. The method of claim 12, wherein generating the new node further includes updating the data value for each of the plurality of movement directions of each of the at least one node included in the node data.

14. The method of claim 13, wherein determining one of the at least one node to be updated includes determine, with respect to at least one of the data value for each of the plurality of movement directions, a node set as the first data value indicating the open movement direction among the at least one node, as a node to be updated.

15. The method of claim 14, wherein moving to one of the nodes to be updated includes:
determining a node positioned a shortest distance from the current position of the moving robot, among the one or more nodes to be updated, based on the node data; and
controlling the moving robot to move to the node positioned the shortest distance from the current position of the moving robot.

16. The method of claim 15, further comprising:
extracting a feature from an image of a region at an exterior of the moving robot;
mapping the extracted feature to the map; and
determining a position of the moving robot based on the feature mapped to the map.

* * * * *